United States Patent [19]
Schneider

[11] Patent Number: 5,984,396
[45] Date of Patent: Nov. 16, 1999

[54] DROP ROOM FLAT FLOOR SYSTEM FOR A VEHICLE HAVING AN EXPANDABLE ROOM SECTION

[75] Inventor: Robert H. Schneider, Beaver Dam, Wis.

[73] Assignee: Applied Power, Inc., Butler, Wis.

[21] Appl. No.: 08/837,047

[22] Filed: Apr. 11, 1997

[51] Int. Cl.⁶ .................................................... B60P 3/35
[52] U.S. Cl. .................. 296/26.14; 296/165; 296/26.13
[58] Field of Search ............................ 296/26.12, 26.13, 296/26.14, 26.15, 165, 171, 175, 172; 52/67

[56] References Cited

U.S. PATENT DOCUMENTS

| | | |
|---|---|---|
| 1,279,819 | 9/1918 | Zingsheim et al. . |
| 2,704,223 | 3/1955 | Houdart . |
| 2,732,251 | 1/1956 | Meaker . |
| 2,813,747 | 11/1957 | Rice, Jr. . |
| 2,842,972 | 7/1958 | Houdart . |
| 2,901,282 | 8/1959 | Meaker . |
| 3,106,750 | 10/1963 | Jarman . |
| 3,169,280 | 2/1965 | Jarman . |
| 3,719,386 | 3/1973 | Puckett et al. . |
| 4,049,310 | 9/1977 | Yoder . |
| 4,128,269 | 12/1978 | Stewart . |
| 4,500,132 | 2/1985 | Yoder . |
| 4,930,837 | 6/1990 | Marsh et al. . |
| 5,090,749 | 2/1992 | Lee . |
| 5,237,782 | 8/1993 | Cooper . |
| 5,280,985 | 1/1994 | Morris . |
| 5,295,430 | 3/1994 | Dewald, Jr. et al. . |
| 5,332,276 | 7/1994 | Blodgett, Jr. . |
| 5,333,420 | 8/1994 | Eden . |
| 5,491,933 | 2/1996 | Miller et al. . |
| 5,570,924 | 11/1996 | Few et al. . |
| 5,577,351 | 11/1996 | Dewald, Jr. et al. . |
| 5,620,224 | 4/1997 | DiBiagio et al. . |
| 5,706,612 | 1/1998 | Tillett ........................................... 52/67 |
| 5,732,839 | 3/1998 | Schimmang et al. .................... 220/1.5 |

FOREIGN PATENT DOCUMENTS 44 29 927  11/1995  Germany .

*Primary Examiner*—Joseph D. Pape
*Attorney, Agent, or Firm*—Quarles & Brady LLP

[57] ABSTRACT

A vehicle having a slide-out room section includes an operating mechanism for moving the slide-out room section laterally relative to a stationary room section for expanding the interior volume of the vehicle. The slide-out room section has an outer end which is mounted via a vertically movable connection arrangement to the operating mechanism, and a cooperative support arrangement is provided for the inner end of the slide-out room section to enable the slide-out room section to be vertically dropped when fully extended to place the slide-out room section floor flush with the floor of the stationary room section. The cooperative support arrangement for the inner end of the slide-out room section raises the inner end of the slide-out room section when the slide-out room section is retracted, and the vertically movable connection arrangement enables the outer end of the slide-out room section to be raised upon retraction of the slide-out room section. Various embodiments are disclosed for providing vertical movement of the outer end of the slide-out room section relative to the extension member of the operating mechanism. The invention provides a flat floor arrangement for a slide-out room section without any significant modification to existing slide-out room section operating mechanisms.

10 Claims, 21 Drawing Sheets

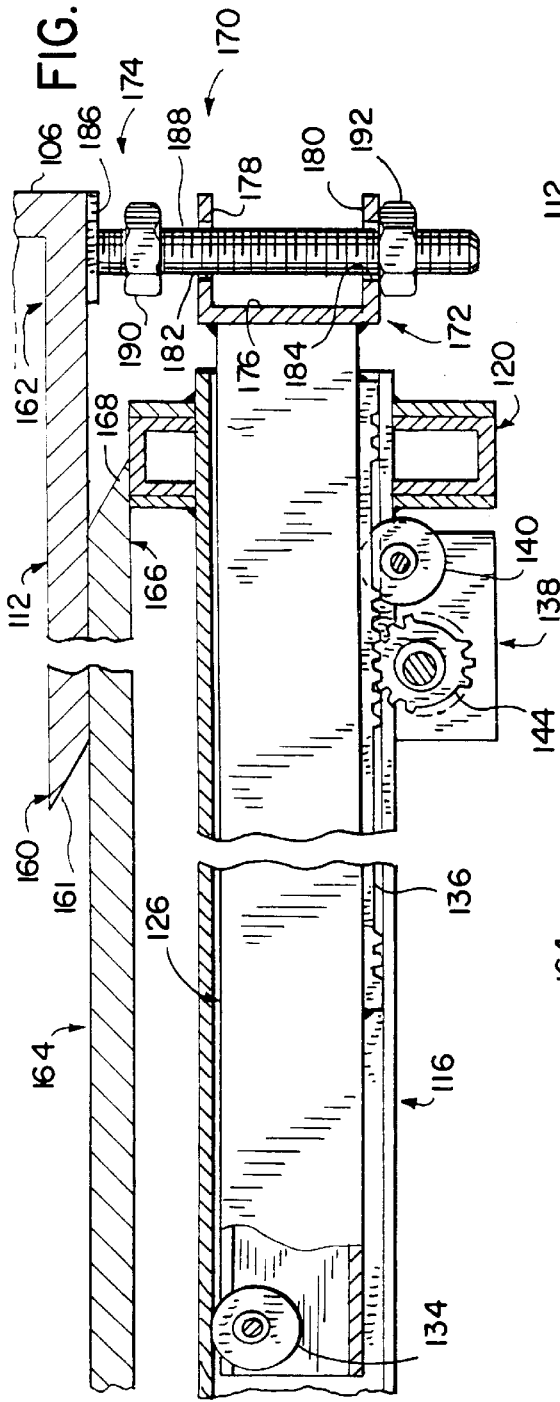
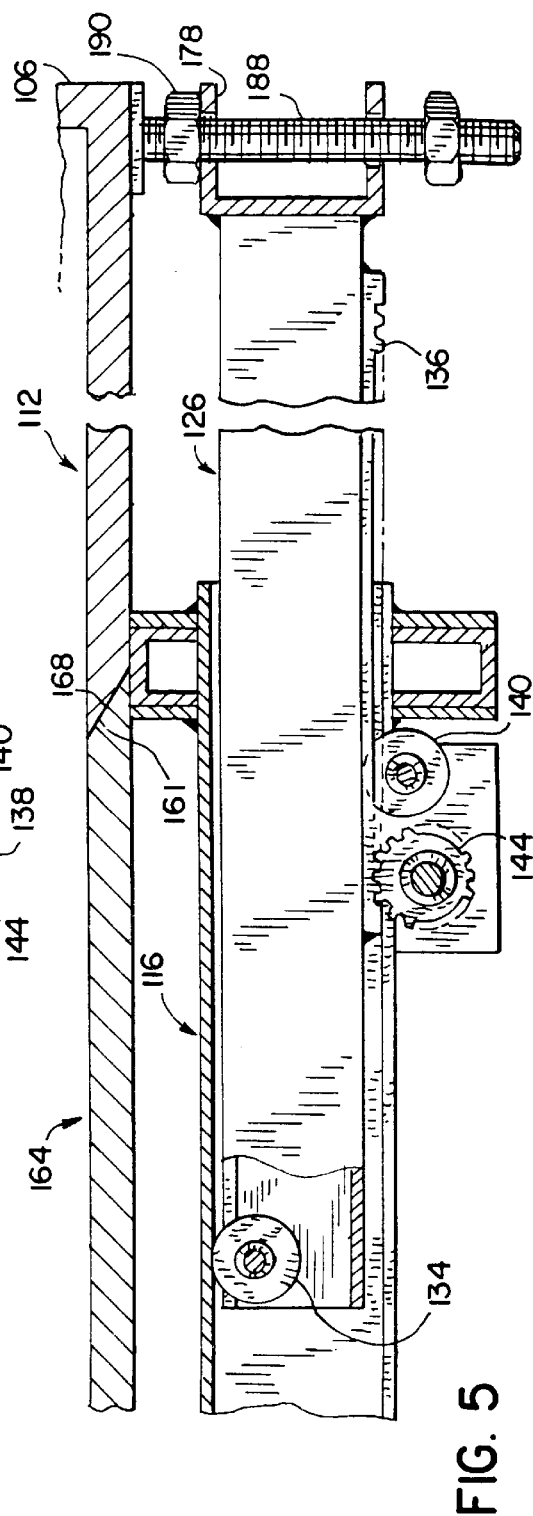
FIG. 4
FIG. 5

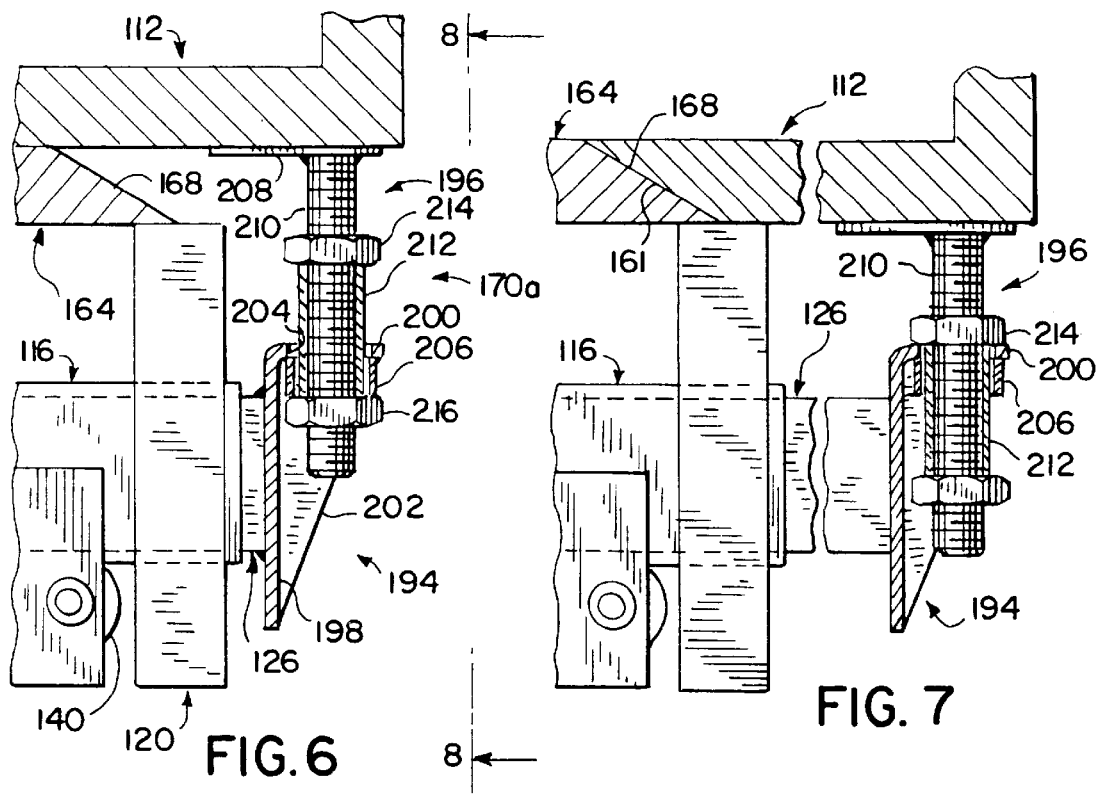
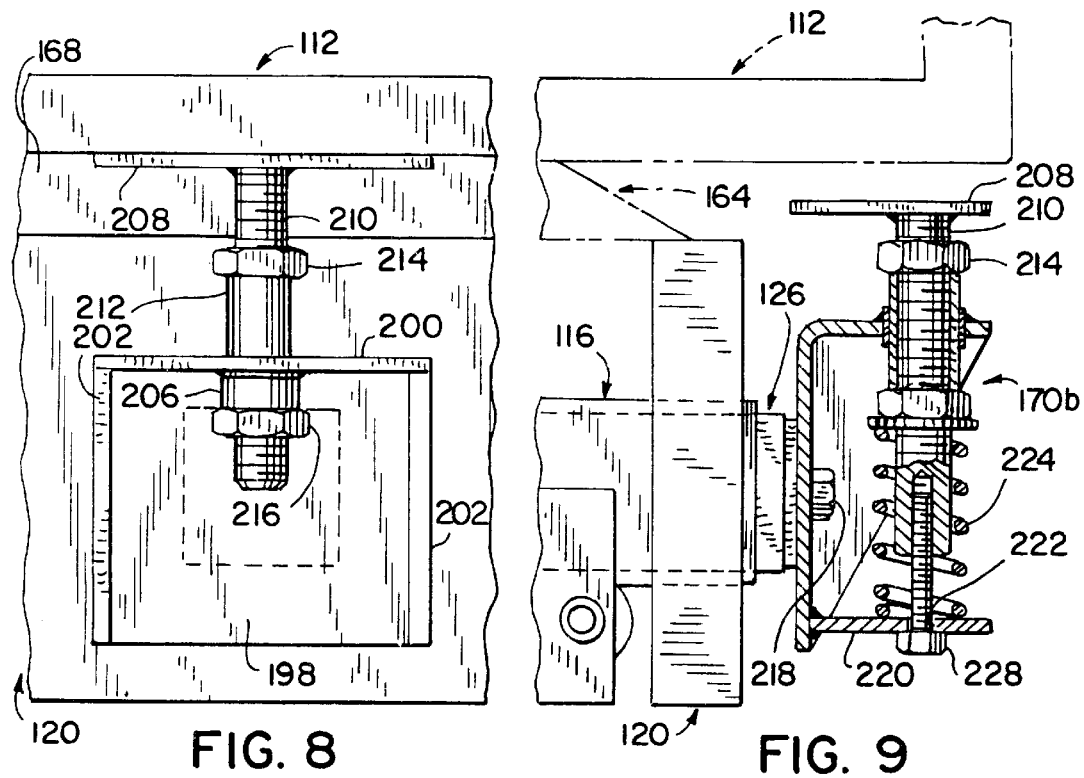

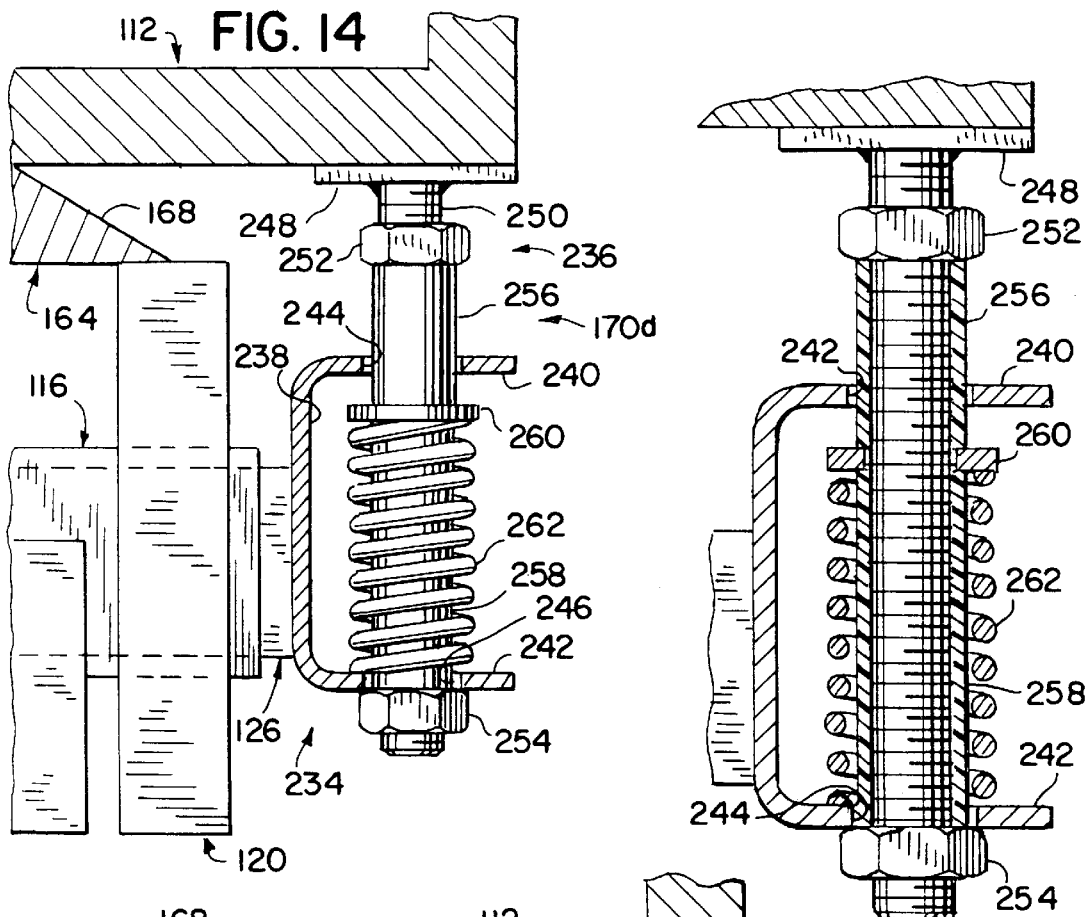
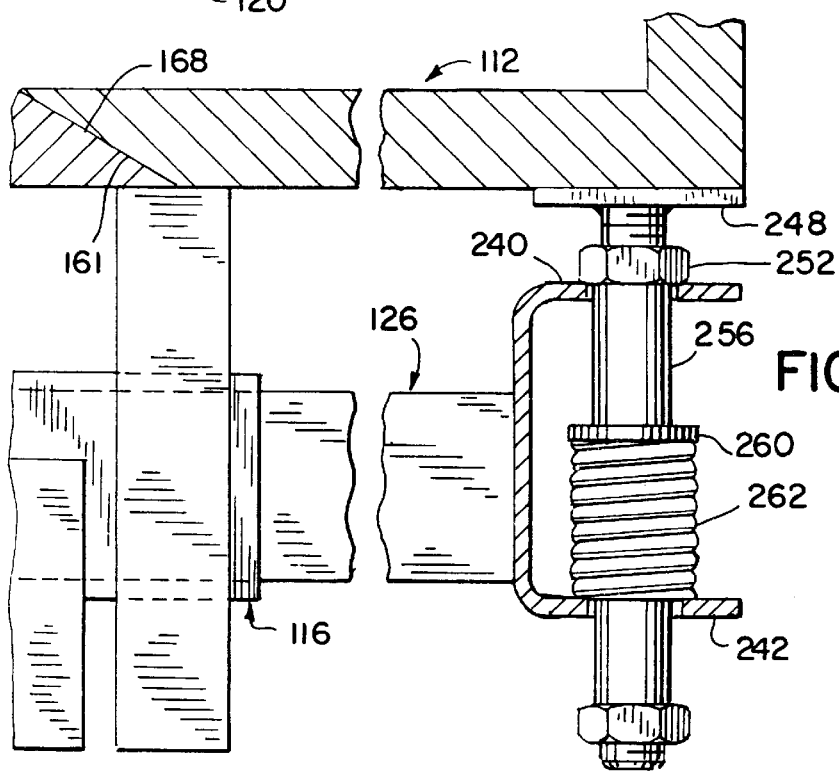
FIG. 14
FIG. 16
FIG. 15

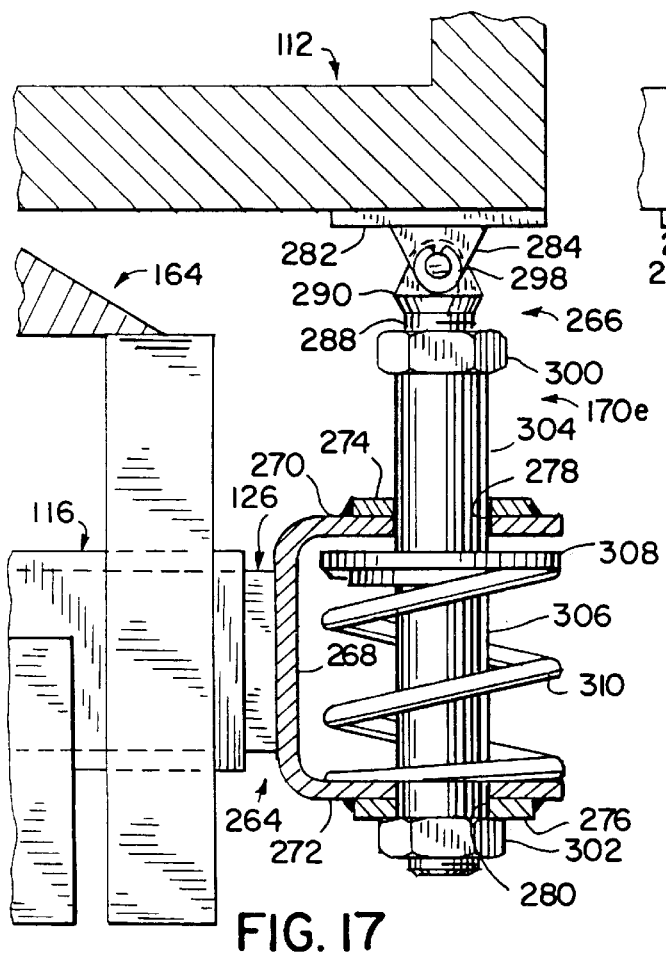
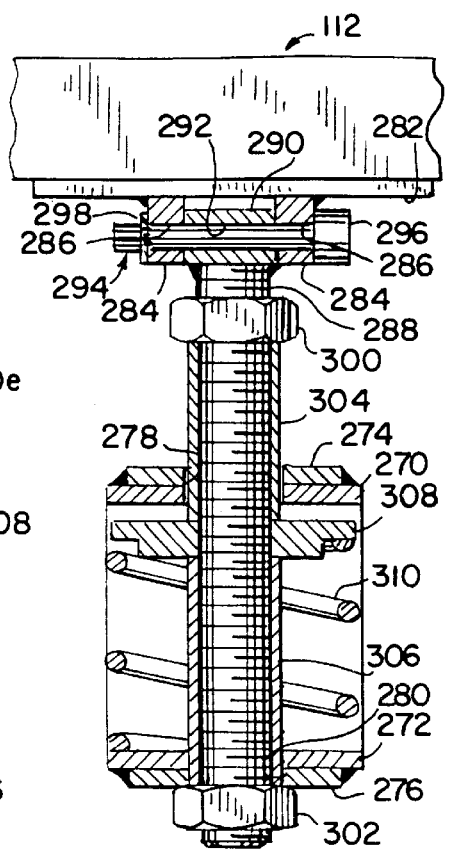
FIG. 17
FIG. 18
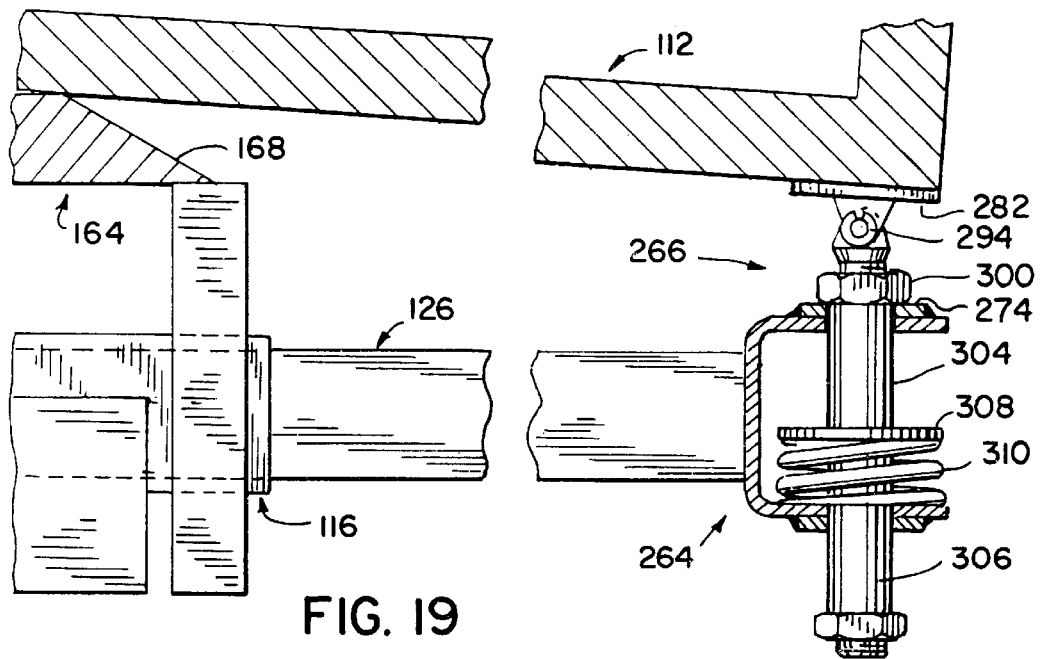
FIG. 19

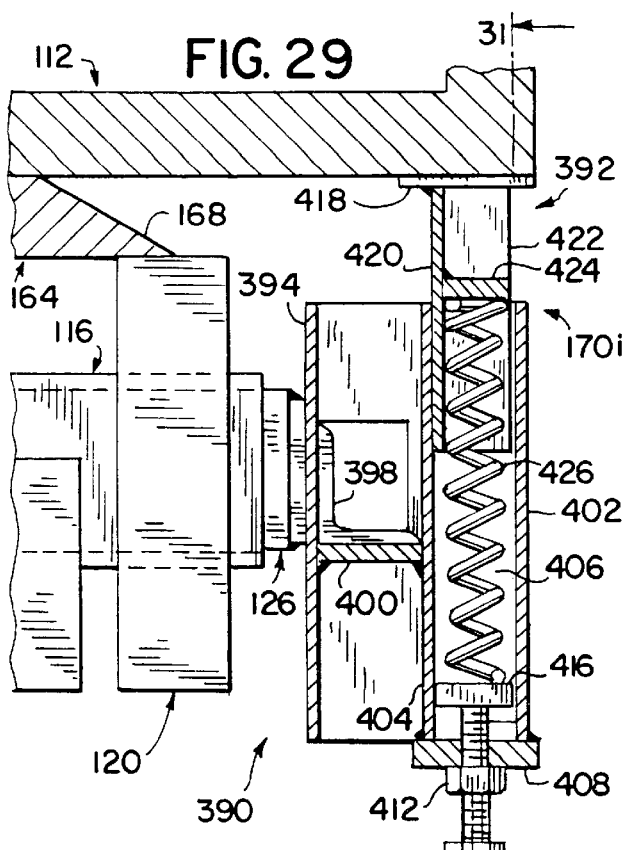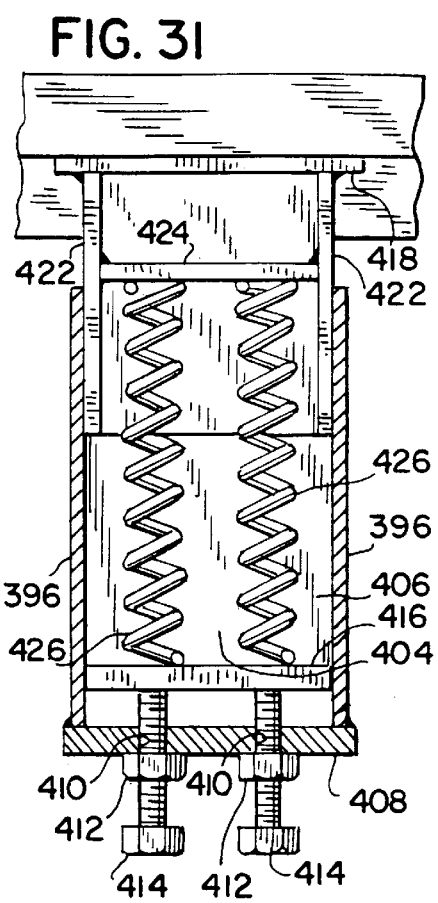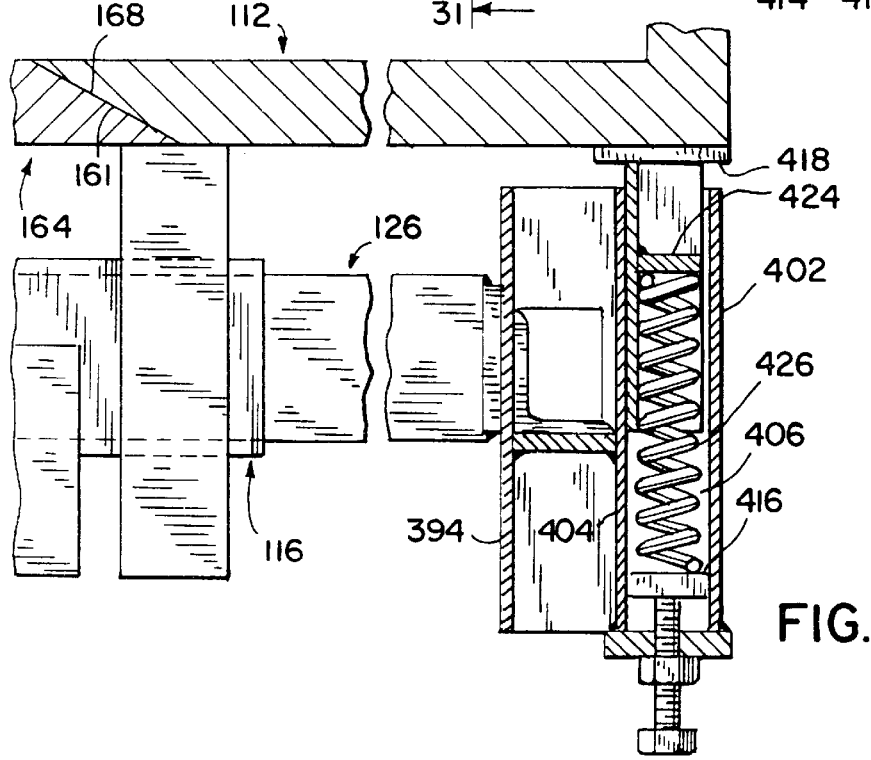

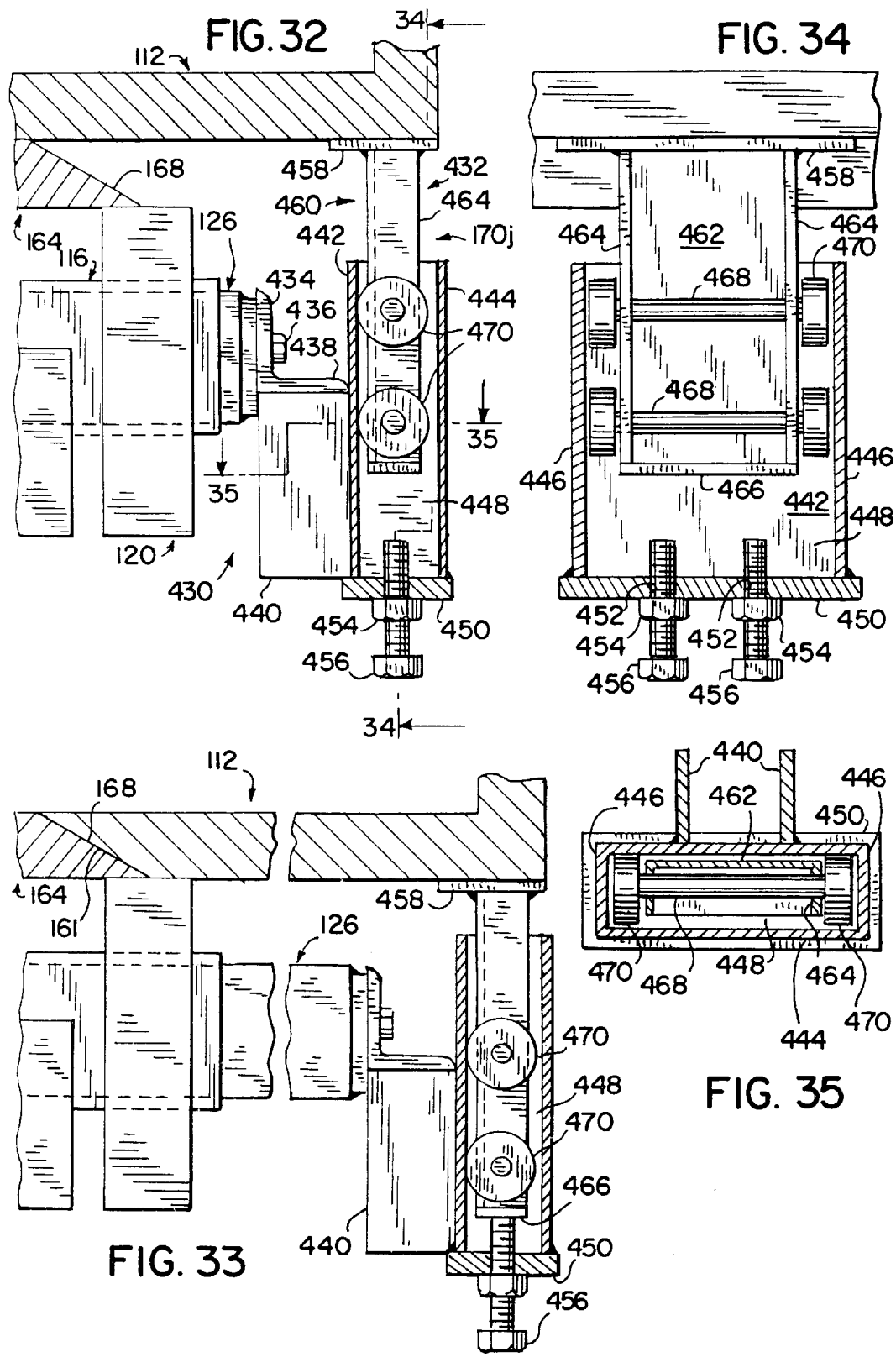

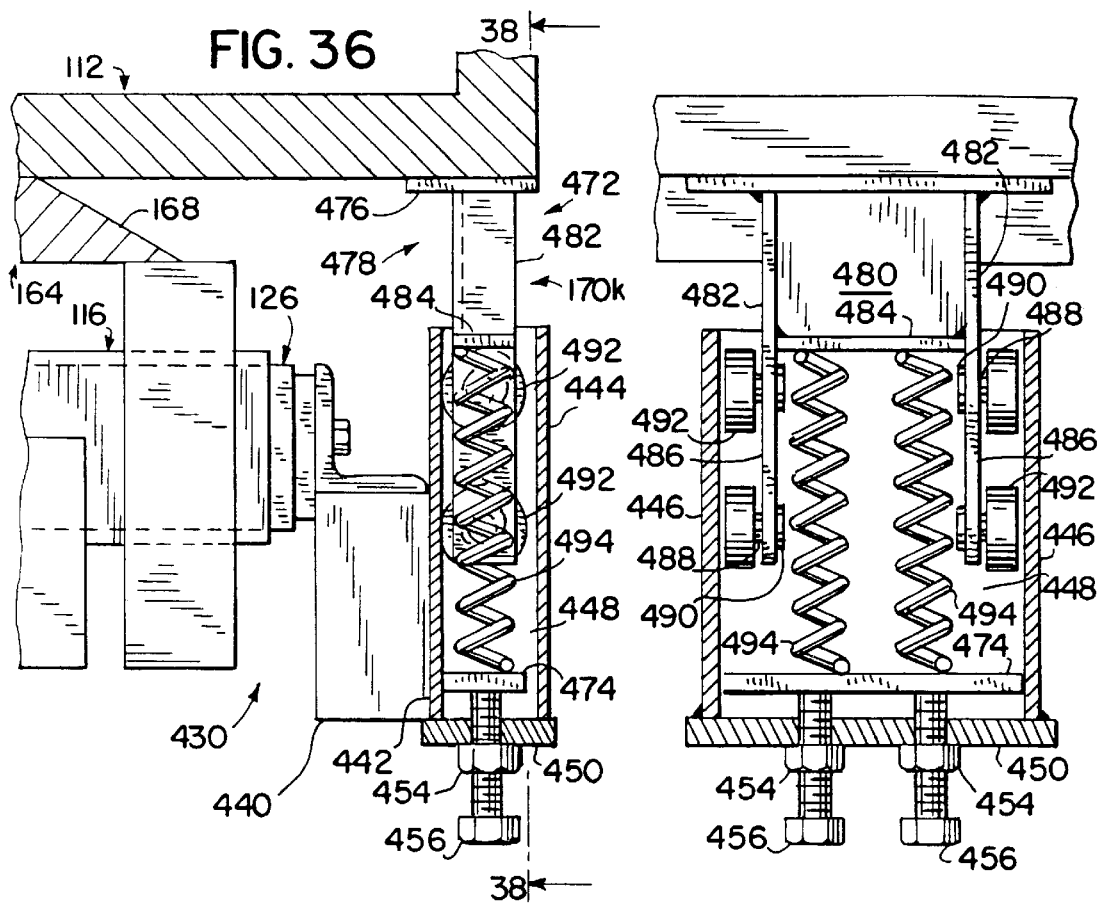
FIG. 36
FIG. 38
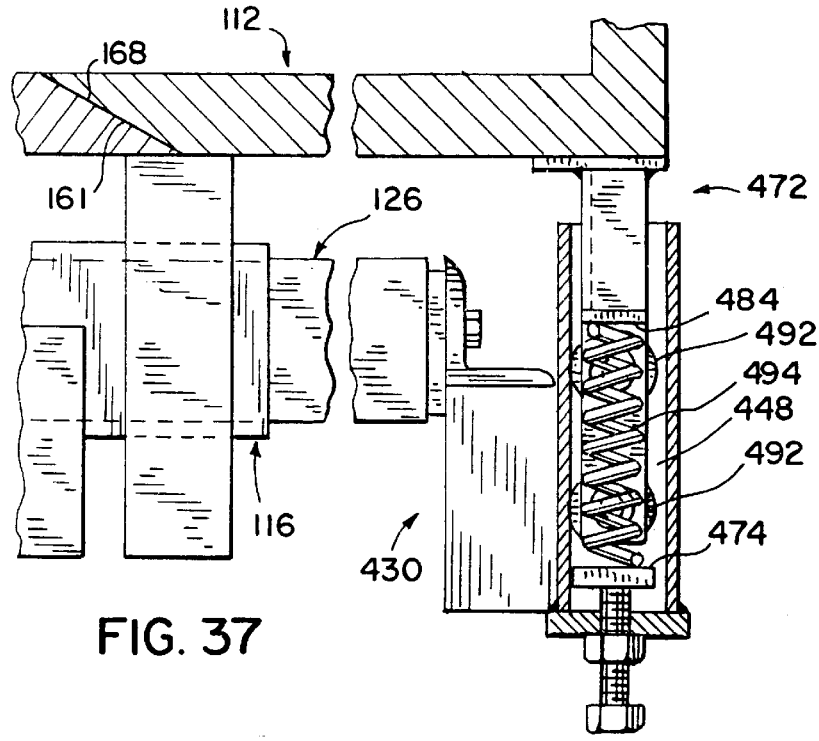
FIG. 37

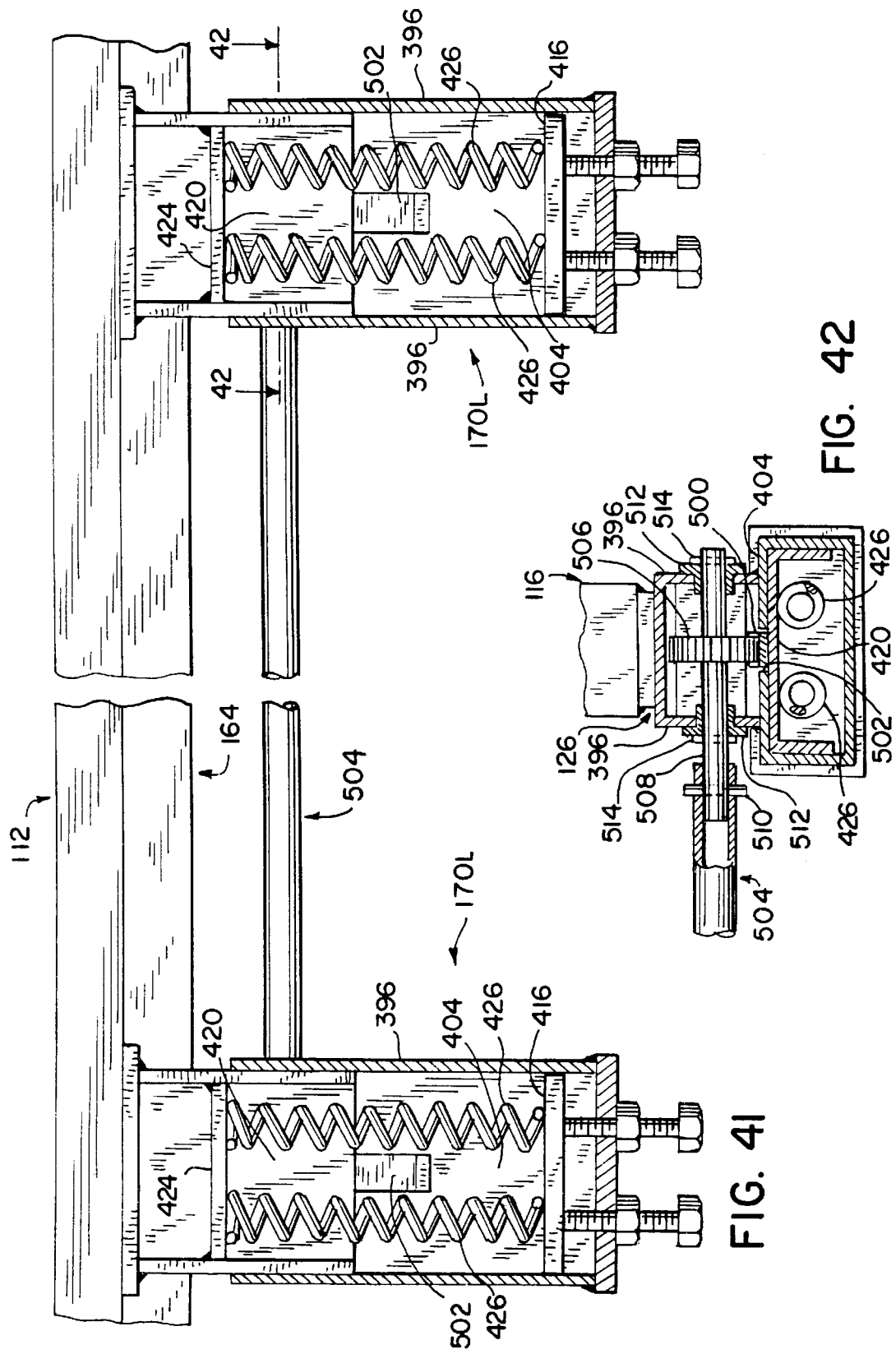

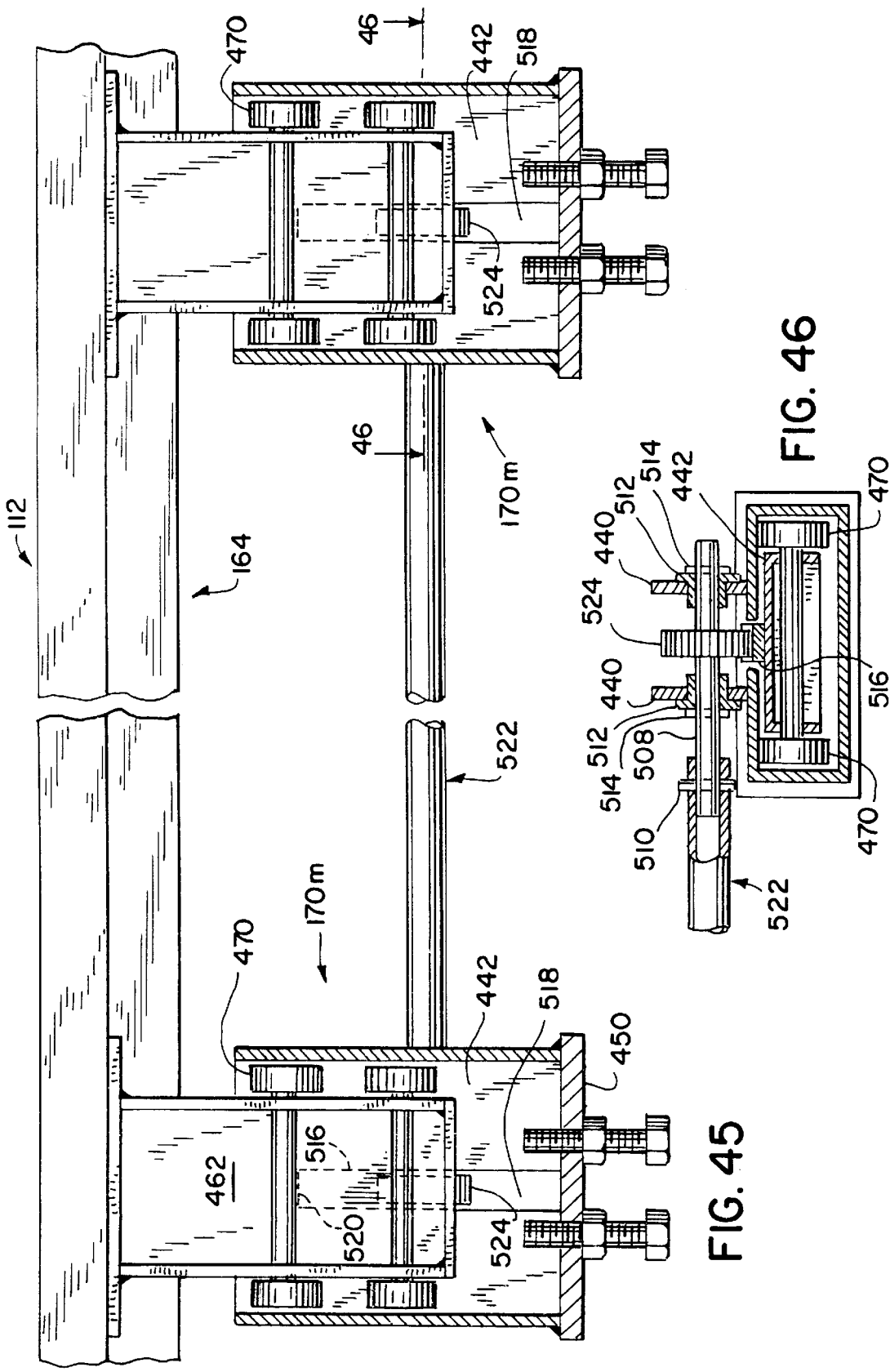

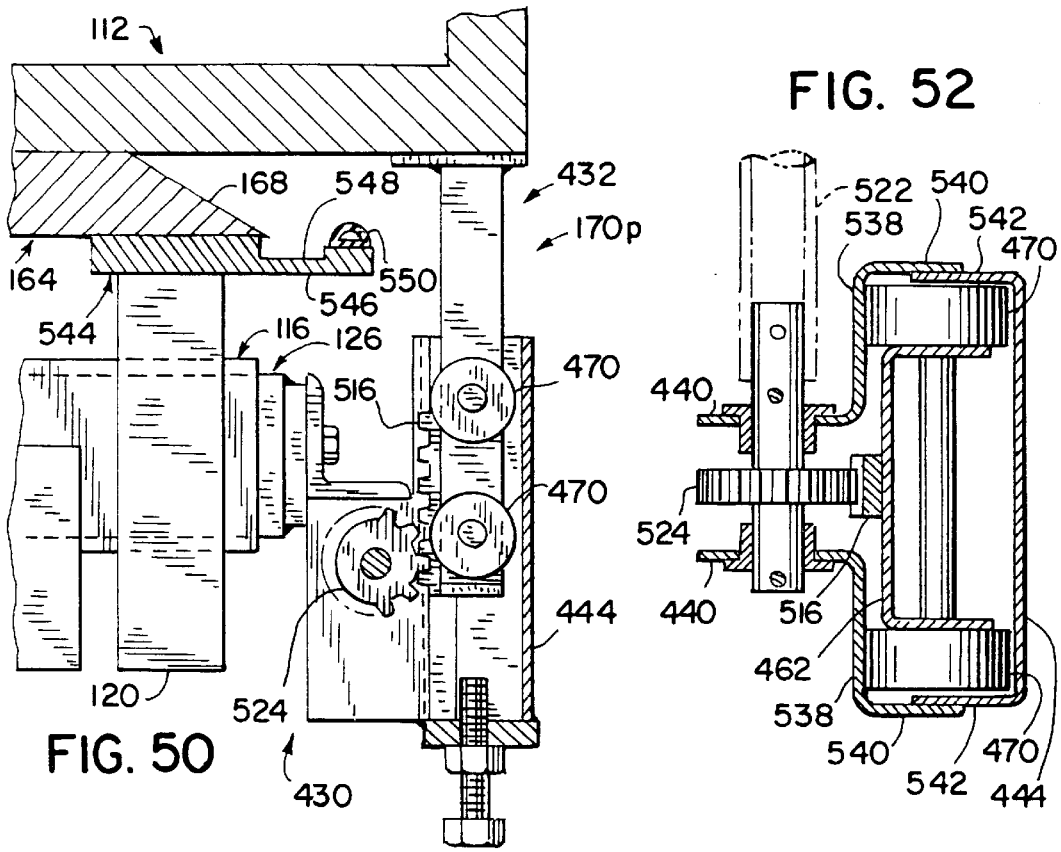
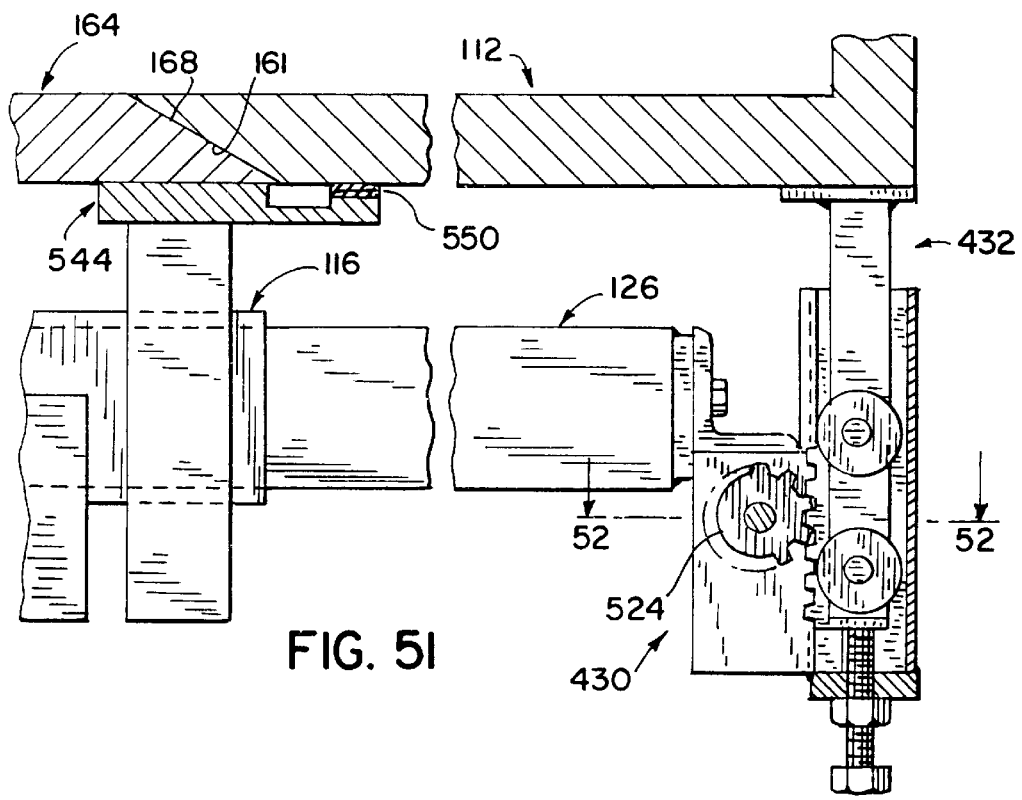

DROP ROOM FLAT FLOOR SYSTEM FOR A VEHICLE HAVING AN EXPANDABLE ROOM SECTION

BACKGROUND AND SUMMARY OF THE INVENTION

This invention relates to vehicles having expandable room sections, and more particularly to an improved arrangement for providing a flat floor condition when an expandable room section is moved to an extended position relative to the vehicle.

In order to increase the available interior space of recreational vehicles or trailers, it is known to provide a slide-out room section integral with the structure of the vehicle or trailer. During transit, the slide-out room section is retracted and stored in the interior of the vehicle or trailer, with the exterior wall of the slide-out room section approximately flush with the exterior of the vehicle or trailer. To use the slide-out room section, the vehicle is first parked and leveled. The slide-out room section is then slid outward from the vehicle to an extended position, increasing the interior space of the vehicle.

In prior art constructions, the floor of the movable slide-out room section is typically supported on the floor of a stationary room section to which the slide-out section is movably mounted. With this construction, the floor of the slide-out room section is higher than the floor of the stationary room section, which creates a step up from the stationary floor to the slide-out room section floor when the slide-out room section is in its extended position. This step formed by the differential in floor height is undesirable, inconvenient and can lead to injury from a person unwarily tripping or stumbling over the step. Besides limiting the mobility of an occupant of the slide-out room section, the step can cause difficulty in furniture placement and detract from the overall aesthetic appearance of the floor.

To address the problems created by the floor height differential discussed above, various slide-out room structures have been proposed which allow the floor of the movable room section to be flush with the floor of the stationary room section when the slide-out room section is in its extended position. One such flat floor slide-out apparatus is disclosed in U.S. Pat. No. 5,491,933 issued Feb. 20, 1996 to Miller et al. In this patent, each of a pair of inner tubes is slidably mounted to one of a pair of outer tubes. The inner tubes are connected to the slide-out room section, and extension of the inner tubes relative to the outer tubes functions to move the slide-out room section outwardly relative to the vehicle. Movement of the inner tubes is caused by a gear engaged with a gear track associated with each inner tube. Each outer tube has a ramped recess formed in an upper wall. A roller is mounted to the inner end of each inner tube, and rides along the ramped recess as the inner tube is extended relative to the outer tube. This movement results in the inner tube pivoting about the drive gear, to lower the outer end of the inner tube and to thereby lower the outer end of the slide-out room section. This structure is disadvantageous in that substantial stresses are placed on the drive gear by the weight of the slide-out room section as the inner tube pivots on the drive gear. Further, this construction requires modification to the structure of the outer tube, which entails tooling and manufacturing costs.

Another flat floor slide-out arrangement is illustrated in Schneider U.S. Pat. No. 5,902,001 Ser. No. 08/823,169, filed Mar. 25, 1997) (Attorney Reference 796-00043). The construction illustrated in this patent employs a notch formed in the inner end of each inner tube, with a gear track extending along the lower wall of the inner tube and along the notch. As the drive gear rotates to extend the inner beam outwardly, the drive gear rides along the contour of the gear track provided by the notch, which results in simultaneous extension and downward movement of the inner tube relative to the outer tube to extend and lower the slide-out room section relative to the stationary room section. This construction is generally satisfactory, but again entails modification of the inner tube or beam in order to lower the slide-out room section upon extension.

It is an object of the present invention to provide a flat floor slide-out room section for a vehicle which accomplishes a flat floor condition without modification to the beams or rails to which the slide-out room section is mounted and which provides movement of the slide-out room section between its extended and retracted positions. It is a further object of the invention to provide a flat floor slide-out arrangement which is extremely simple in its components and assembly, yet which provides highly reliable operation in raising and lowering the slide-out room section during movement of the slide-out room section between its extended and retracted positions. Yet another object of the invention is to provide a relatively simple and straight forward modification in the mounting of the slide-out room section to the beam to which the slide-out room section is mounted, for providing movement of the slide-out room section between a raised and lowered position for providing a flat floor condition when the slide-out room section is extended.

In accordance with the invention, a flat floor arrangement is provided for a vehicle including a movable room section having a floor, which is movable relative to a stationary room section having a floor. An operating mechanism is mounted to the vehicle and includes an extension member interconnected with the movable room section for moving the movable room section between a retracted position and an extended position for increasing the interior volume of the vehicle. The invention contemplates a vertically movable connection arrangement interposed between the movable room section and the extension member of the operating mechanism, for providing vertical movement of the movable room section relative to the stationary room section between first and second vertical positions. The vertically movable connection arrangement is preferably configured so as to provide downward vertical movement of the outer end of the movable room section, under the force of gravity, when the movable room section is moved to its extended position, and upward vertical movement of the movable room section outer end when the movable room section is moved to its retracted position. The invention further contemplates a cooperative support arrangement interposed between the stationary room section and the inner end of the movable room section. The cooperative support arrangement provides downward vertical movement of the movable room section inner end when the movable room section is in its extended position, and upward vertical movement of the movable room section when the movable room section is moved away from its extended position toward its retracted position. In this manner, the movable room section is moved vertically between a first, lowered position when fully extended and a second, raised position when retracted. In a preferred form, the vertically movable connection arrangement includes a support member interconnected with the extension member and movable therewith, and a mounting member secured to the movable room section and engaged with the support member. The mounting member is mounted to the support member so as to be vertically movable relative thereto, such that vertical movement of the mounting member relative to the support member results in vertical movement of the movable room section relative to the extension member.

The invention provides a variety of mounting arrangements by which the mounting member is mounted for vertical movement relative to the support member. In one embodiment, the support member includes one or more laterally extending portions, such as one or more flanges, and an opening is formed in at least one of the support member flanges. The mounting member extends through the one or more openings so as to provide vertical movement of the mounting member relative to the support member. In an embodiment in which aligned openings are formed in a pair of flanges, the mounting member extends through both of the passages.

The invention further provides stop structure associated with the mounting member and engageable with the support member for limiting the range of vertical movement of the mounting member relative to the support member. The stop structure may be in the form of a stop member secured to the mounting member and engageable with the flange in which the opening is formed so as to support the movable room section in its lowered position when the movable room section is extended. The stop member may be engaged with the mounting member such that the position of the stop member relative to the mounting member is adjustable, to adjust the vertical position of the movable room section relative to the support member.

In one embodiment, passage structure is mounted to the one or more flanges, defining a passage through which the mounting member extends. The passage structure may take the form of a sleeve fixed in position relative to the one or more flanges, and positioned such that the passage defined by the sleeve is in alignment with the opening formed in the flange. A second sleeve is secured to the mounting member and is movable therewith, and is received within the passage structure. The first-mentioned and second sleeves define a cooperative sliding bearing arrangement for facilitating vertical movement of the mounting member relative to the support member.

The mounting member is movable relative to the support member between a raised position when the movable room section is retracted, and a lowered position when the movable room section is fully extended. A biasing element is preferably interposed between the support member and the mounting member for urging the mounting member toward its raised position, to thereby urge the movable room section in an upward vertical direction. The biasing element is preferably in the form of a spring. In an embodiment in which the support member defines a pair of flanges, the spring has a lower end engageable with the lower flange and an upper end engageable with engagement structure provided on the mounting member, for urging the mounting member upwardly relative to the support member. In an embodiment in which the support member defines a single flange, the spring has a lower end engageable with the support member flange and an upper end engageable with the movable room section, for biasing the movable room section upwardly relative to the support member. The lower end of the spring maybe engageable with an adjustment arrangement interposed between the spring and the support member, for adjusting the biasing force exerted by the spring on the movable room section.

The mounting member may be secured to the movable room section via a pivot connection providing pivoting movement of the movable room section about a substantially horizontal axis as the movable room section is moved between its extended and retracted positions. With this arrangement, the movable room section tips relative to the stationary room section when the movable room section attains a predetermined position relative to the stationary room section, during movement of the movable room section toward both its extended and retracted positions.

In one embodiment, the vertically movable connection arrangement is in the form of a telescoping guide assembly interconnected between the support member and the extension member. The telescoping guide assembly includes an upper tubular guide member mounted to and depending downwardly from the movable room section, and a lower tubular guide member mounted to and extending upwardly from the extension member. The upper and lower tubular guide members are mounted for telescoping movement relative to each other. A spring is preferably engageable between the upper and lower guide members for biasing the movable room section upwardly, and stop structure is preferably interposed between the support member and the mounting member for controlling the range of movement of the movable room section between its first and second vertical positions.

In another embodiment, the vertically movable connection arrangement includes a substantially vertical passage provided in the support member, and the mounting member includes a roller arrangement disposed within the support member passage such that engagement of the roller arrangement within the support member passage functions to guide the vertical movement of the movable room section between its first and second vertical positions. Again, this embodiment contemplates stop structure interposed between the support member and the mounting member for controlling the range of movement of the movable room section between its first and second vertical positions, and a spring is engaged between the support member and the mounting member for biasing the mounting member toward an upward vertical position relative to the support member.

In an embodiment in which the operating mechanism includes a pair of spaced extension members mounted to the vehicle and interconnected with the movable room section, a support member is mounted to each of the extension members and a mounting member is engaged with each support member via a vertically movable connection arrangement. The invention further contemplates a synchronizing mechanism interconnected between the mounting members for providing synchronous vertical movement of the mounting members relative to the extension members upon movement of either one of the mounting members, for providing even movement of the movable room section between its first and second vertical positions. This embodiment is especially advantageous when the movable room section is unevenly loaded, when one side of the movable room section may tend to drop more quickly than the other side when the movable room section is moved to its extended position. The synchronizing mechanism may take the form of a series of vertical teeth associated with each mounting member, a pinion engaged with each set of teeth and rotatably mounted to one of the support members, and a synchronizing drive shaft fixed to and extending between the pinions. This arrangement provides synchronous rotation of the pinions as the movable room section is raised and lowered, to ensure that both ends of the movable room section are raised and lowered simultaneously relative to the stationary room section as the movable room section is moved between its extended and retracted positions.

The invention further contemplates a lifting arrangement for insuring the movable room section is moved to its second, raised position when retracted. The lifting arrangement includes a stationary surface, such as a track member fixed relative to the stationary room section floor and disposed therebelow, and a lifting member secured to the underside of the movable room section floor, which is engageable with the stationary surface for raising the movable room section relative to the stationary room section when the movable room section attains a predetermined position relative to the stationary room section during retraction of the movable room section. In one embodiment, the lifting member is in the form of one or more rollers mounted to the underside of the movable room section floor. An inner roller engages the stationary surface upon initial movement of the inner end of the movable room section during retraction. The inner roller rides along the stationary surface to facilitate retraction of the movable room section, and an outer roller then engages the stationary surface when the movable room section attains a predetermined retracted position. The outer roller is arranged so as to raise the outer end of the movable room section, such that the movable room section floor is parallel to the stationary room section floor when the movable room section is fully retracted. In another embodiment, the lifting member is in the form of a wedge structure mounted to the underside of the movable room section floor. The wedge structure engages the stationary surface and includes an angled lifting surface which raises the movable room section floor relative to the stationary room section floor when the movable room section attains a predetermined position relative to the stationary room section during retraction. In either embodiment, the lifting arrangement functions to positively move the movable room section to its fully raised position relative to the stationary room section upon movement of the movable room section to its retracted position, to provide positive sealing between the movable and stationary room sections upon full retraction.

The invention further contemplates an improvement in a vehicle having a slide-out room section, an overall vehicle having a slide-out room section, and a method of mounting a slide-out room section in such a vehicle, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 4 is a partial sectional view of the operating mechanism of FIG. 3, showing the slide-out room section in its retracted position and the movable room section raised relative to the stationary room section;

FIG. 5 is a view similar to FIG. 4, showing the slide-out room section in its extended position and lowered such that the slide-out room section floor is flush with the stationary room section floor;

FIG. 6 is a partial sectional view showing an alternative vertically movable connection arrangement for the slide-out room section operating mechanism of FIGS. 3–5, showing the slide-out room section raised relative to the stationary room section;

FIG. 7 is a view similar to FIG. 6, showing the slide-out room section in a lowered position relative to the stationary room section;

FIG. 8 is a partial end elevation view with reference to line 8—8 of FIG. 6;

FIG. 9 is a view similar to FIG. 7, showing an embodiment in which a spring is engaged between the support member and the mounting member for urging the slide-out room section toward its raised position, and showing a shipping condition prior to engagement of the mounting member with the floor of the slide-out room section;

FIGS. 14 and 15 are views similar to FIGS. 6 and 7, respectively, showing an alternative arrangement for interconnecting a spring between the mounting member and the support member;

FIG. 16 is a partial section view showing the spring mounting arrangement for the embodiment of FIG. 14;

FIG. 17 is a view similar to FIG. 6, showing an embodiment in which a pivot connection is provided between the slide-out room section and the mounting member;

FIG. 18 is a section view of the embodiment of FIG. 17;

FIG. 19 is a view of the embodiment of FIG. 17, showing movement of the slide-out room section toward its extended position and pivoting of the slide-out room section relative to the stationary room section;

FIGS. 29 and 30 are views similar to FIGS. 6 and 7, respectively, showing an alternative embodiment for the vertically movable connection arrangement;

FIG. 31 is a partial section view taken along line 31—31 of FIG. 29;

FIGS. 32 and 33 are views similar to FIGS. 6 and 7, respectively, showing an alternative embodiment for the vertically movable connection arrangement incorporating rollers mounted to the mounting member and received within a passage defined by the support member;

FIG. 34 is a partial section view taken along line 34—34 of FIG. 32;

FIG. 35 is a section view taken along line 35—35 of FIG. 32;

FIGS. 36 and 37 are views similar to FIGS. 32 and 33, respectively, showing a spring assembly for biasing the movable room section upwardly;

FIG. 38 is a section view taken along line 38—38 of FIG. 36;

FIG. 41 is a view taken along line 41—41 of FIG. 39, showing interconnection of the vertically movable connection arrangements for providing synchronous movement of the slide-out room section between its raised and lowered positions;

FIG. 42 is a partial section view taken along line 42—42 of FIG. 41;

FIG. 45 is a partial section view taken along line 45—45 of FIG. 43;

FIG. 46 is a partial section view taken along line 46—46 of FIG. 45;

FIGS. 50 and 51 are views similar to FIGS. 43 and 44, respectively, showing an alternative construction for the support member and structure for providing a seal between the movable room section floor and the exterior of the vehicle;

FIG. 52 is a section view taken along line 52—52 of FIG. 1;

DETAILED DESCRIPTION OF THE INVENTION

The present invention provides an expandable room section attached to a known trailer or recreational vehicle which provides distinct advantages over the prior art as will be described and appreciated hereafter. In the preferred embodiment, the trailer or recreational vehicle (generally referred to as the vehicle) is equipped with a laterally movable wing or slide-out section used to provide additional interior room space. However, it should be understood that the invention can also apply to expandable sections or compartments provided on other vehicles for use in construction, military, medical, education, mobile broadcast and other applications, to expand the inside volume of the vehicle.

Figure 1:
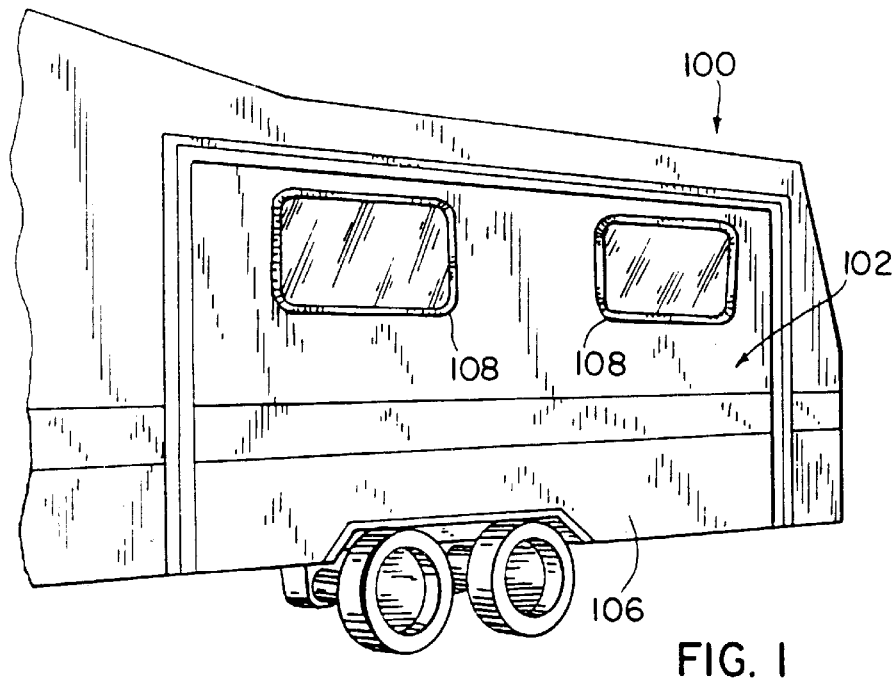
FIG. 1 is an isometric view of a vehicle, such as a recreational vehicle or trailer, having a slide-out room section and in which the slide-out room section is in its retracted position.
Figure 2:
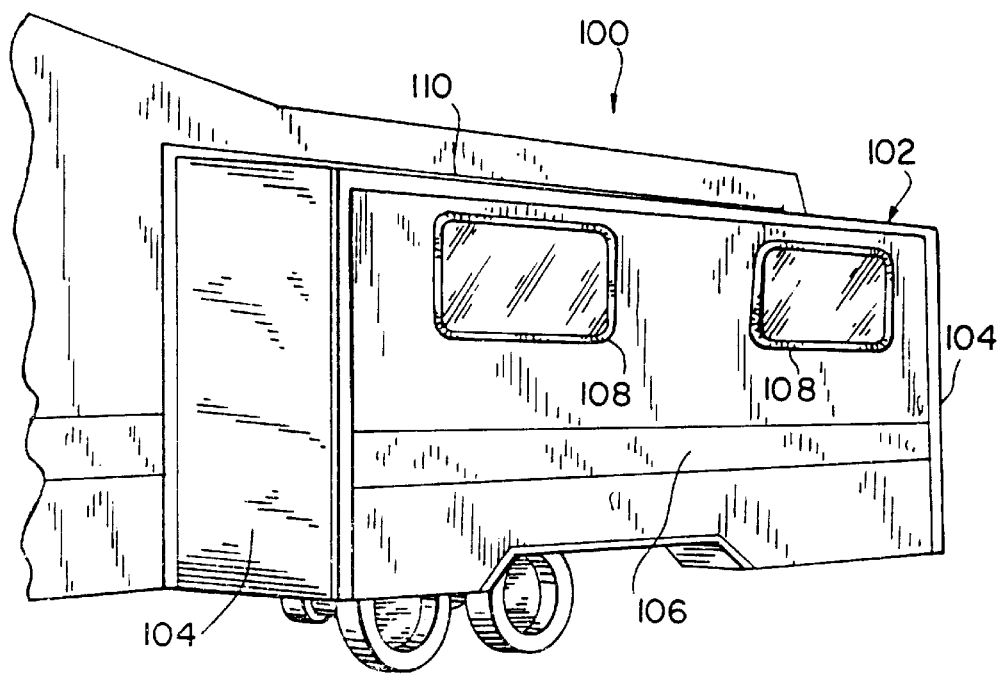
FIG. 2 is a view similar to FIG. 1, showing the slide-out room section in its extended position.

Referring now to the drawings, FIG. 1 illustrates a side perspective view of a vehicle 100 having mounted thereon an expandable telescopic slide-out room section 102 of the present invention in its fully retracted position. FIG. 2 is a view similar to FIG. 1, showing slide-out room section 102 fully extended or expanded. Slide-out room section 102 is rectangularly configured and includes a pair of parallel end walls 104, a side wall 106 with two windows 108, and an upper wall or roof 110. Slide-out room section 102 further includes an internal floor 112, shown in FIG. 4.

Figure 3:
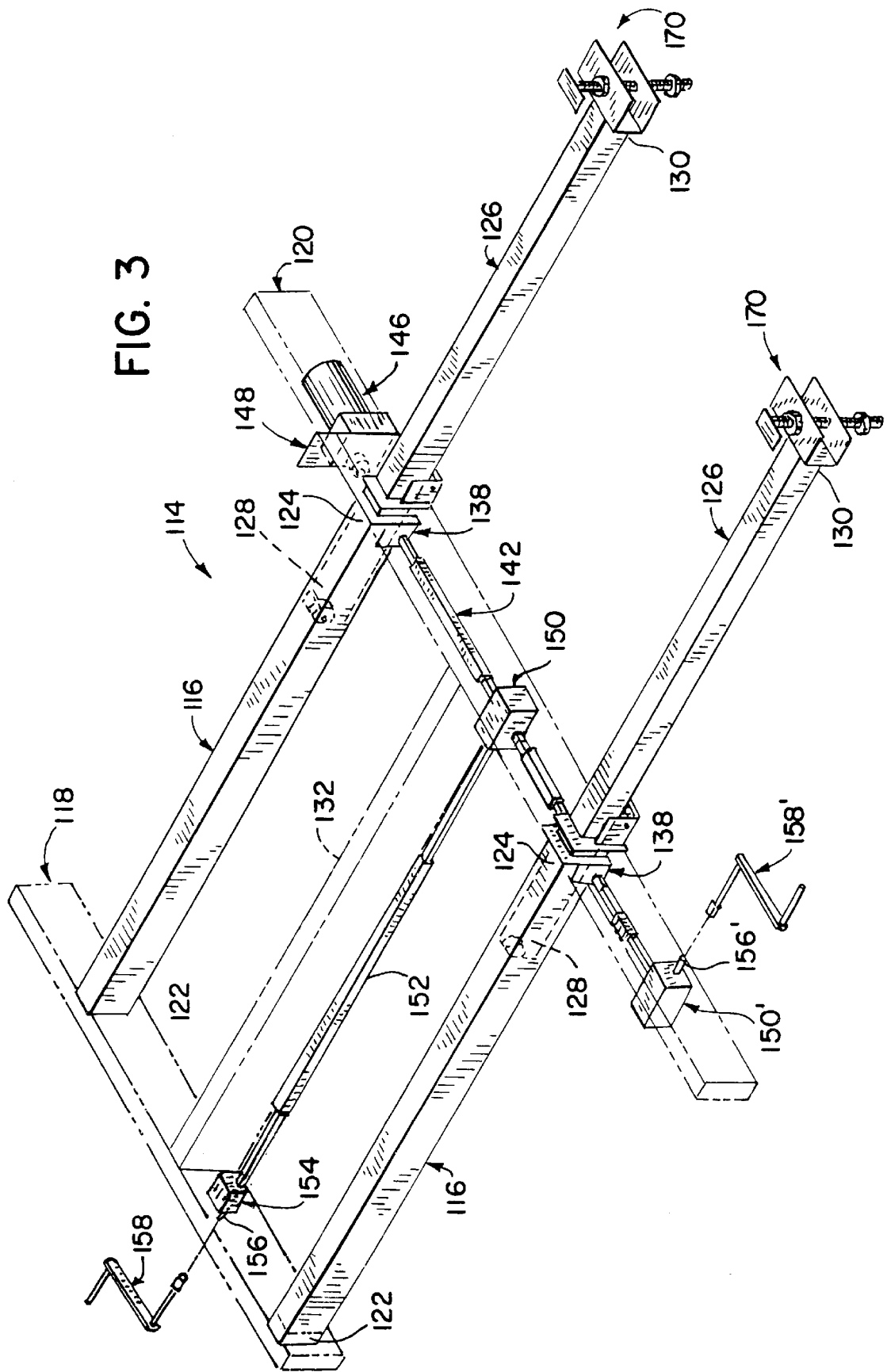
FIG. 3 is an isometric view of an operating mechanism connected to the vehicle of FIG. 1 for moving the slide-out room section between its extended and retracted positions.

FIG. 3 illustrates an operating mechanism 114 interconnected with vehicle 100 and slide-out room section 102 for selectively controlling the extension and retraction of slide-out room section 102. Generally, operating mechanism 114 includes a pair of parallel tubular outer rail members 116 which extend between and are mounted to a pair of parallel structural frame members 118, 120, which form part of the frame of vehicle 100 and which extend along the sides of the vehicle body. Each outer rail member 116 defines an inner end 122 secured to structural frame member 118. Each outer rail member 116 further defines an outer end 124 mounted to structural frame member 120. The ends 122, 124 of outer rail members 116 are mounted to structural frame members 118, 120, respectively, in any satisfactory manner, such as by welding.

Apertures or passages are formed in structural frame member 120, in alignment with the passages defined by tubular outer rail members 116. A tubular inner rail member 126 is received within the passage defined by each outer rail member 116, so as to be movable inwardly and outwardly in a telescoping manner relative to each outer rail member 116. Each inner rail member 126 extends outwardly of structural frame member 120 through the apertures or passages formed therein in alignment with the passage defined by the outer rail member 116 within which the inner rail member 126 is received.

Each inner rail member 126 defines an inner end 128 received within the passage defined by one of outer rail members 116, and an outer end 130 located outwardly of the outer rail member 116 and structural frame member 120.

The frame of vehicle 100 further includes a central transverse cross-member 132, which extends between and interconnects longitudinal structural frame members 118, 120 between outer rail members 116.

Referring to FIGS. 3–5, each of inner rail members 126 has an upper roller 134 mounted adjacent its inner end 128. Roller 134 extends above the upper wall of inner rail member 126, and engages the inner surface of the upper wall of the outer rail member 116 within which inner rail member 126 is received. A gear rack 136 is mounted to the lower wall of inner rail member 126, and defines a series of laterally spaced downwardly extending teeth, in a manner as is known. A bracket assembly 138 is mounted to each outer rail member 124 adjacent its connection to structural frame member 120, and a pair of lower rollers 140 are rotatably mounted to bracket assembly 140 and are located one on either side of gear rack 136. Rollers 140 engage the lower wall of inner rail member 126. With this construction, rollers 134 and 140 function to provide sliding inward and outward lateral movement of inner rail members 126 relative to outer rail members 116.

A drive system for moving inner rail members 126 inwardly and outwardly relative to outer rail members 116 includes a drive shaft assembly 142 rotatably supported by bracket assemblies 138, and a pair of drive gears 144. Each drive gear 144 has a series of circumferential teeth engaged with the teeth of one of gear racks 136, such that rotation of drive shaft assembly 142 rotates drive gears 144 to move inner rail members 126 inwardly and outwardly relative to outer rail members 116. A motive device in the form of an integral motor-brake assembly 146 is mounted to a motor mounting bracket assembly 148 secured to one of outer rail members 116 adjacent structural frame member 120, and is drivingly interconnected with one end of drive shaft assembly 142. Motor-brake assembly 146 is preferably in the form of an electric motor having an integral brake, and is operable to selectively rotate and prevent rotation of drive shaft assembly 142 in response to input signals provided thereto by an operator, for selectively moving inner rail members 126 inwardly and outwardly relative to outer rail members 116.

In the event motor-brake assembly 146 is inoperable for any reason or otherwise becomes incapable of rotating drive shaft assembly 142, a manual override assembly can be employed to impart rotation to drive shaft assembly 142 for selectively moving inner rail members 126 inwardly and outwardly relative to outer rail members 116. The manual override assembly includes a gear box 150 having an input drive gear for receiving rotary input power from an override drive shaft 152, and an output drive gear engaged with drive shaft assembly 142 for providing rotation to drive shaft assembly 142 in response to rotation of override drive shaft 152. Preferably, the gears housed within gear box 150 are conventional bevel gears, although any other satisfactory right angle drive arrangement can be employed. Override drive shaft 152 is connected at its end opposite gear box 150 to an input box 154 mounted to structural frame member 118, and an input stub shaft 156 extends from input box 154. A crank 158 is engageable with stub shaft 156 for providing manual rotary input power to input box 154 for rotating output drive shaft 154.

In an alternative embodiment, an override gear box 150' may be mounted to the end of drive shaft assembly 142 for providing direct rotation of drive shaft assembly 142 in response to manual input power provided to override gear box 150' via crank 158' and input stub shaft 156' extending from gear box 150'.

With the described construction, the manual override can be provided on the side of vehicle 100 adjacent slide-out room section 102 via gear box 150' being mounted to structural frame member 120, or can be provided on the opposite side of vehicle 100 via mounting of input box 154 to structural frame member 118 and override drive shaft 152 extending transversely between input box 154 and override gear box 150.

The components and operation of operating mechanism 114 as described above are in accordance with the disclosure of copending application Ser. No. 08/563,043 filed Nov. 27, 1995, the disclosure of which is hereby incorporated by reference.

Slide-out room section 102 defines an outer end and an inner end. Referring to FIGS. 4 and 5, floor 112 of slide-out room section 102 defines an inner end 160 at the inner end of slide-out room section 102 and defining a beveled edge 161, and an outer end 162 at the outer end of slide-out room section 102, from which slide-out room section side wall 106 extends upwardly. Slide-out room section 102 is movable inwardly and outwardly by operation of operating mechanism 114 relative to a stationary room section defined by vehicle 100, which includes a stationary floor 164 which defines an outer end 166 supported by structural frame member 120 and defining a beveled edge 168.

FIGS. 3–5 illustrate a first embodiment of an end condition mounting assembly 170 interposed between each inner rail member 126 and slide-out room section 102. Generally, each end condition mounting assembly 170 includes a support member 172 mounted to the end of inner rail member 126, and a mounting member 174 secured to slide-out room section 102.

In the embodiment of FIGS. 3–5, support member 172 is in the form of a C-shaped channel section having a web 176 mounted to the end of inner rail member 126 such as by welding, and upper and lower flanges 178, 180, respectively, extending outwardly from the upper and lower ends, respectively, of web 176. Aligned openings in the form of slots 182, 184 are formed in flanges 178, 180, respectively, extending along a generally vertical axis.

Mounting member 174 includes a plate 186 connected to the underside of slide-out room section floor 112 at its outer end 162, and a threaded shaft 188 extending vertically downwardly from plate 186. An upper jam-type stop nut 190 is threadedly engaged with shaft 188 above upper flange 178, and a lower jam-type stop nut 192 is threadedly engaged with shaft 188 below lower flange 180. Shaft 188 extends through aligned slots 182, 184 in upper and lower flanges 178, 180, respectively, and slots 182, 184 are sized so as to provide lateral inward and outward movement of shaft 188 therewith.

In operation, the embodiment of FIGS. 3–5 functions as follows. During transit, slide-out room section 102 is in its retracted position of FIG. 1, which is partially shown in section in FIG. 4 wherein slide-out room section floor 112 is located above stationary room section floor 164 such that slide-out room section 102 rests on and is supported by stationary room section floor 164. When it is desired to move slide-out room section 102 to its extended position of FIG. 2, the vehicle 100 is first parked and leveled, and the operator then actuates operating mechanism 114 so as to extend inner rail members 126 relative to outer rail members 116 by operation of motor-brake assembly 146 to rotate drive shaft assembly 142 and drive gears 144, which moves inner rail members 126 outwardly via engagement with gear rack 136 on each outer rail member 126. This extension of inner rail members 126 results in movement of slide-out room section 102 from its retracted position of FIG. 1 toward its extended position of FIG. 2. As slide-out room section 102 moves outwardly relative to stationary room section floor 164, slide-out room section 102 reaches a point at which the weight of slide-out room section 102 outwardly of stationary room section floor 164 exceeds the weight of slide-out room section 102 supported by stationary room section floor 164. At this point, slide-out room section 102 tips in a clockwise direction about the outer end of stationary room section floor 164 at its intersection with beveled edge 168, such that slide-out room section floor 112 is angled relative to stationary room section floor 164. Slots 182, 184 in mounting member flanges 178, 180 accommodate movement of shaft 188, such that shaft 188 is positioned toward the outer end of slot 182 and the lower end of shaft 188 is positioned toward the inner end of slot 184 when slide-out room section 102 tips in this manner. Slot 184 in lower flange 180 is configured such that the inner edge of slot 184 remains in engagement with the lower end of shaft 188. When slide-out room section 102 pivots in this manner relative to stationary room section floor 164, upper stop nut 190 engages upper flange 178 to support the outer end of slide-out room section 102. Extension of inner rail members 126 continues such that, as slide-out room section 102 approaches its fully extended position, beveled edge 161 of slide-out room section floor 112 begins moving downwardly along mating beveled edge 168 defined by stationary room section floor 164. This results in downward vertical movement of the inner end of slide-out room section 102. When slide-out room section 102 is in its fully extended position of FIGS. 2 and 5, inner end 160 of slide-out room section floor 112 is supported by structural frame member 120 and beveled edges 161, 168 of slide-out room section floor 112 and stationary room section 164, respectively, are engaged with each other in a complementary relationship such that the upper surfaces of slide-out room section floor 112 and stationary room section floor 164 are substantially coplanar. The outer end of slide-out room section 102 is supported by engagement of upper stop nut 190 with upper support member flange 178.

When it is desired to return slide-out room section 102 to its retracted position of FIGS. 1 and 4, the operator actuates the controls of operating mechanism 114 to operate motor-brake assembly 146 in a reverse direction so as to move inner rail members 126 inwardly relative to outer rail members 116. Upon initial movement of slide-out room section 102 away from its fully extended position, beveled edge 161 of slide-out room section floor 112 rides along beveled edge 168 of stationary room section floor 164 so as to displace inner end 160 of slide-out room section floor 112 upwardly relative to stationary room section floor 164, until the lower surface of slide-out room section floor 112 engages the upper surface of stationary room section floor 164 at its intersection with beveled edge 168. This vertical upward movement of the inner end of slide-out room section 102 causes inner end 160 of slide-out room section 102 to move upwardly relative to outer end 162, thus again tipping slide-out room section 102 and its floor 112 relative to stationary room section floor 164. Upper stop nut 190 maintains engagement with upper flange 178 to support the outer end of slide-out room section 102, until the weight of slide-out room section 102 inwardly of the fulcrum defined by the intersection of beveled edge 168 with the upper surface of slide-out room section 164 exceeds the weight of slide-out room section 102 outwardly thereof. Slid-eout room section 102 then returns to its configuration of FIG. 4, in which slide-out room section floor 112 rests on and is supported by stationary room section floor 164. Again, slots 182, 184 accommodate inward and outward movement of shaft 188 as slide-out room section 102 pivots during retraction. Lower stop nut 192 engages support member lower flange 180 to prevent upward vertical movement of the outer end of slide-out room section 102 beyond a desired range of motion.

It can thus be appreciated that slide-out room section 102 is lowered relative to the stationary room section of vehicle 100 when operating mechanism 114 is operated to fully extend slide-out room section 102, without any modification or alteration to the basic components of operating mechanism 114 as shown and described in the above-referenced patent application, other than end condition mounting assembly 170 which provides upward and downward vertical movement of the outer end of slide-out room section 102 relative to inner rail members 126.

In all embodiments, an appropriate seal construction is provided between roof 110, side walls 104 and the underside of slide-out room section 102, and the edges of the opening in vehicle 100 within which slide-out room section 102 is received. The seal between slide-out room section roof 1 10 and the adjacent edge of the vehicle opening accommodates the lowering and raising of slide-out room section 102, in accordance with known seal technology.

FIGS. 6–8 illustrate an alternative end condition mounting assembly 170a for use in place of end condition mounting assembly 170 in interconnecting slide-out room section 102 with inner rail members 126. In the embodiment of FIGS. 6–8, as well as in the other embodiments to be described hereafter, the basic components of operating mechanism 114 and slide-out room section 112 are as described with reference to FIGS. 1–5.

Like the embodiment illustrated in FIGS. 3–5, end condition mounting assembly 170a includes a support member 194 and a mounting member 196. Support member 194 is in the form of an inserted L-shaped section having a web 198 mounted to the end of inner rail member 126 by any satisfactory means such as by welding, and a flange 200 extending outwardly from the upper end of web 198. A pair of gussets 202 are welded to web 198 and flange 200 for reinforcing flange 200.

An opening in the form of a slot 204 is formed in flange 200. A sleeve 206 is welded to the underside of flange 200, and defines a passage in alignment with slot 204, such that the passage defined by sleeve 206 and opening 204 define an upwardly opening vertical passage.

Mounting member 196 includes a mounting plate 208 and a threaded shaft 210 welded at its upper end to mounting plate 208 and extending vertically downwardly therefrom. Shaft 210 extends through a bearing sleeve 212. An upper jam-type stop nut 214 is engaged with the upper end of sleeve 212, and a lower jam-type stop nut 216 is engaged with the lower end of sleeve 212. With this construction, the position of sleeve 212 on threaded shaft 210 can be adjusted by moving stop nuts 214, 216 upwardly or downwardly while maintaining nuts 214, 216 in engagement with the upper and lower ends, respectively, of bearing sleeve 212. Bearing sleeve 212 has an outside diameter smaller than the inside diameter defined by sleeve 206 and less than the length of slot 204, such that bearing sleeve 212 is slidable upwardly and downwardly relative to sleeve 206 and such that bearing sleeve 212 is laterally movable relative to sleeve 206. Bearing sleeve 212 may be constructed of any satisfactory material, such as metal or plastic. Preferably, bearing sleeve 212 is a low-friction material such as nylon, to provide smooth movement of bearing sleeve 212 relative to sleeve 206.

In operation, the embodiment of FIGS. 6–8 functions similarly to that of FIGS. 3–5 in providing upward and downward vertical movement of slide-out room section 102 during retraction and extension of slide-out room section 102 by operation of operating mechanism 114. In the embodiment of FIGS. 6–8, slot 204 and sleeve 206 and bearing sleeve 212 accommodate tipping of slide-out room section 102 as it is raised and lowered, while bearing sleeve 212 and sleeve 206 provides a low-friction arrangement facilitating vertical movement of slide-out room section 102.

Figure 10:
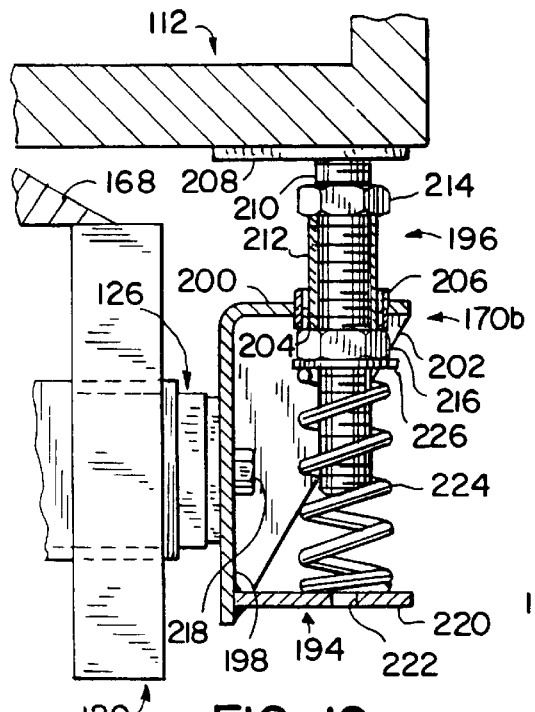
FIGS. 10 and 11 are views similar to FIG. 9 showing the slide-out room section in its raised and lower positions, respectively.
Figure 11:
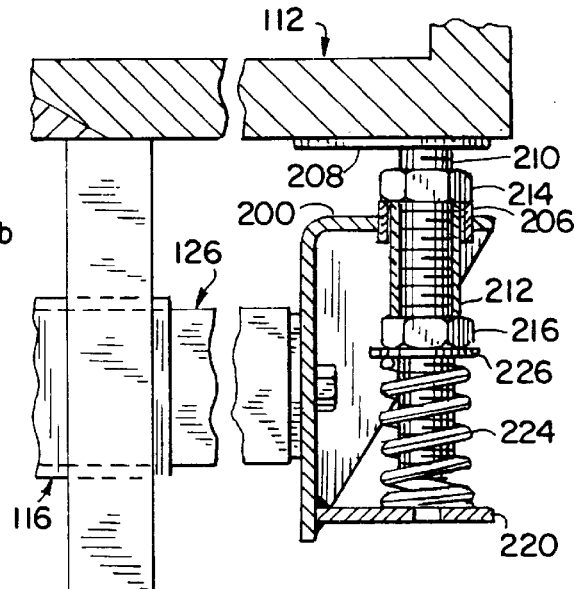

FIGS. 9–11 illustrate an alternative end condition mounting assembly 170b for interconnecting slide-out room section 102 with inner rail members 126. FIG. 9 illustrates end condition mounting assembly 170b in a shipping and installation configuration, and FIGS. 10 and 11 illustrate end condition mounting assembly 170b as installed. End condition mounting assembly 170b is similar in construction to end condition mounting assembly 170a, and like reference characters will be used where possible to facilitate clarity.

Referring to FIG. 10, end condition mounting assembly 170b includes support member 194 and mounting member 196, similarly to end condition mounting assembly 170a. Mounting assembly 170b shows web 198 of L-shaped support member 194 secured to the outer end of inner rail member 126 via a bolt 218, although it is understood that any other satisfactory connection means could be employed. In the embodiment of FIGS. 9–11, support member 194 includes a lower horizontal wall 220 connected at its inner end to the lower extremity of web 198 such as by welding. An opening 222 is formed in lower wall 220.

In the embodiment of FIGS. 9–11, sleeve 206 is oriented relative to flange 200 such that a portion of sleeve 206 extends upwardly from the upper surface of flange 200 and a portion of sleeve 206 extends downwardly from the lower surface of flange 200. Opening 204 in flange 200 is sized so as to receive sleeve 206, such that sleeve 206 is secured such as by welding to flange 200 adjacent opening 204. In a preferred form, opening 204 and sleeve 206 have an oval configuration.

Mounting member 196 has essentially the same construction in end condition mounting assembly 170b as in end condition mounting assembly 170a, including plate 208 secured to the underside of slide-out room section floor 112, threaded shaft 210 mounted to and extending downwardly from plate 208, and upper and lower jam-type stop nuts 214, 216 engaging the upper and lower ends, respectively, of bearing sleeve 212.

End condition mounting assembly 170b further includes a spring 224 having a lower end which bears against the upper surface of lower wall 220, and an upper end which bears against a washer 226 engaged with the underside of lower stop nut 216. Washer 226 may be rigidly mounted to lower stop nut 216, or alternatively may be sandwiched between lower stop nut 216 and the upper end of spring 224.

In operation, spring 224 functions to bias mounting member 196 upwardly relative to support member 194, so as to urge slide-out room section 102 toward its raised position. The biasing force exerted by spring 224 is overcome by the weight of slide-out room section 102 when slide-out room section 102 is moved toward its extended position. During retraction of slide-out room section 102, spring 224 functions to assist in raising the outer end of slide-out room section 102 as slide-out room section 102 is moved toward its retracted position from its extended position. FIG. 11 illustrates slide-out room section 102 in its extended position and the resultant compression of spring 224. Again, the passage defined by sleeve 206 accommodates the angular offset of bearing sleeve 212 as slide-out room section 102 tips relative to inner rail members 126 during movement between its extended and retracted positions.

Referring to FIG. 9, a bolt 228 has its shank extending through opening 222 in lower wall 220 and engaged within a threaded passage 230 extending upwardly into threaded shaft 210 from its lower end. Bolt 220 functions to maintain mounting member 196 in its lowered position as shown in FIG. 9 in which spring 224 is compressed, to prevent movement of mounting member 196 relative to support member 194 during shipping and installation. Once outer rail members 116 and inner rail members 126 are mounted to vehicle frame members 118, 120, bolt 228 is removed and discarded, thus allowing mounting member 126 to be moved upwardly under the force of spring 224, to engage plate 208 with the underside of slide-out room section floor 112 and to enable plate 208 to be connected thereto.

It is understood that a shipping configuration like that of FIG. 9 can be employed in any of the illustrated embodiments, and is not limited to the particular embodiment of FIGS. 9–11.

Figure 12:
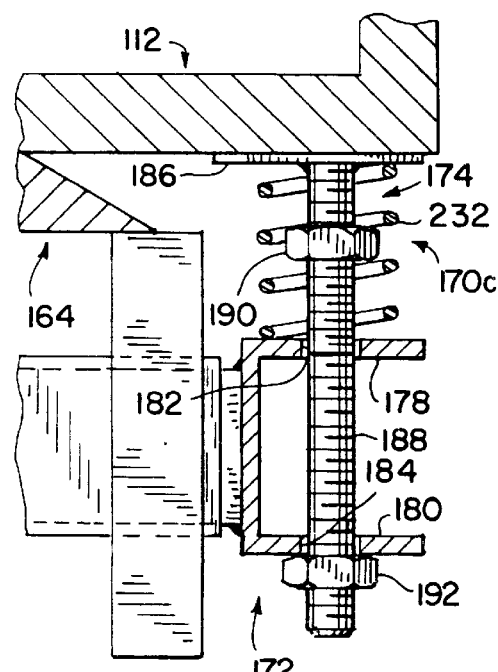
FIGS. 12 and 13 are views similar to FIGS. 6 and 7, respectively, showing a spring engaged between the support member and the slide-out room section.
Figure 13:
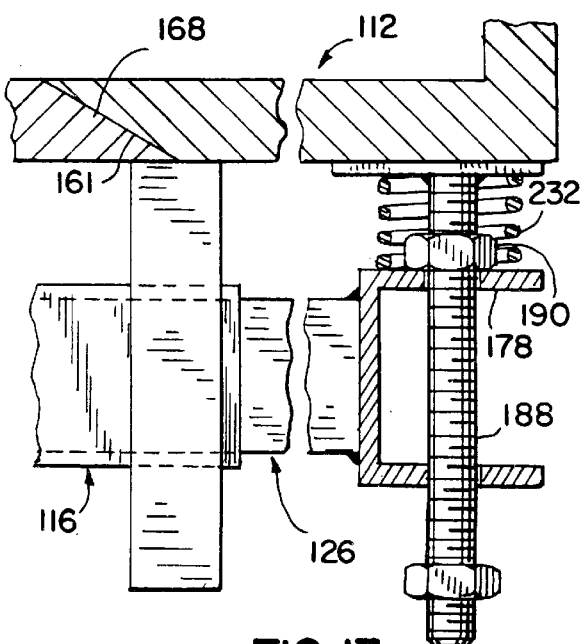

FIGS. 12 and 13 illustrate an end condition mounting assembly 170c which has essentially the same components as end condition mounting assembly 170 illustrated in FIGS. 3–5, and like reference characters will be used to facilitate clarity.

End condition mounting assembly 170c includes a spring 232 which bears at its lower end against the upper surface of upper flange 178, and at its upper end against the underside of plate 186. Spring 232 of end condition mounting assembly 170c functions in the same manner as spring 224 in end condition mounting assembly 170b, to bias mounting member 174 upwardly relative to support member 172, and to thereby urge slide-out room section 102 toward its raised position relative to stationary room section floor 164. As shown in FIG. 13, spring 232 is compressed under the weight of slide-out room section 102 when slide-out room section 102 is in its extended position and the outer end of slide-out room section 102 is supported by engagement of upper stop nut 190 with flange 178.

FIGS. 14–16 illustrate an alternative end condition mounting assembly 170d for interconnection between inner rails 126 and slide-out room section floor 112. End condition mounting assembly 170d includes a support member 234 and a mounting member 236. Support member 234 is a C-shaped member having a web 238 mounted such as by welding to the outer end of inner rail member 126, and upper and lower flanges 240, 242 extending outwardly from the upper and lower ends, respectively, of web 238. Aligned vertical openings in the form of slots 244, 246 are formed in upper and lower flanges 240, 242, respectively.

Mounting member 236 includes a plate 248 secured to the underside of slide-out room section floor 112. A threaded shaft 250 is mounted at its upper end to plate 248, extending vertically downwardly therefrom. An upper jam-type stop nut 252 is threadedly engaged with shaft 250 above upper flange 240, and a lower jam-type stop nut 254 is threadedly engaged with threaded shaft 250 below lower flange 242.

Referring to FIG. 16, upper stop nut 252 engages the upper end of an upper bearing sleeve 256, and lower stop nut 254 engages the lower end of a lower bearing sleeve 258. A disc-like engagement member 260 defines an opening through which threaded shaft 250 extends. Engagement member 260 is sandwiched between the lower end of upper bearing sleeve 256 and the upper end of lower bearing sleeve 258, and stop nuts 252, 254 are adjusted on threaded shaft 250 to securely clamp engagement member 260 between upper and lower bearing sleeves 256, 258, respectively.

A spring 262 defines a lower end engaged with the upper surface of lower flange 242 and an upper end engaged with the underside of engagement member 260. Spring 262 provides the same function as in end condition mounting assemblies 170b and 170c, to bias mounting member 236 upwardly relative to support member 234 for urging slide-out room section 102 upwardly relative to vehicle 100 and stationary room section floor 164.

As in the embodiments of FIGS. 3–5, 12 and 13, end condition mounting assembly 170d provides sliding engagement of mounting member 236 at two distinct, vertically spaced locations, i.e. at upper flange 240 and lower flange 242. Bearing sleeves 256 and 258 are sized relative to flange slots 244 and 246, respectively, so as to provide sufficient lateral movement to accommodate the angular offset of bearing sleeves 256, 258 when slide-out room section 102 tips relative to inner rail members 126, while providing a smooth surface for accommodating vertical movement between mounting member 236 and support member 234.

Bearing sleeves 256, 258 may be constructed of any satisfactory low friction material, such as metal or a thermoplastic material such as nylon.

FIG. 15 illustrates end condition mounting assembly 170d when slide-out room section 102 is in its extended position, in which spring 262 is compressed under the weight of slide-out room section 102 by downward movement of mounting member 236 relative to support member 234.

FIGS. 17–19 illustrate an alternative end condition mounting assembly 170e for interconnecting slide-out room section floor 112 and each inner rail member 126. End condition mounting assembly 170e includes a support member 264 mounted to inner rail member 126 and a mounting member 266 secured to slide-out room section floor 112.

As in prior embodiments, support member 264 is a C-shaped member including a web 268 mounted such as by welding to the outer end of inner rail member 126, and upper and lower flanges 270, 272 extending from the upper and lower ends, respectively, of web 268. An upper reinforcing disc 274 is mounted to the upper surface of upper flange 270 such as by welding, and a lower reinforcing disc 276 is mounted to the lower surface of lower flange 272, again such as by welding.

Aligned openings are formed in upper flange 270 and upper reinforcing disc 274, so as to define an upper passage 278, and aligned openings are formed in lower flange 272 and lower reinforcing disc 276 so as to define a vertical passage 280. Passages 278 and 280 are vertically aligned with each other.

As shown in FIGS. 17 and 18, mounting member 266 includes a plate 282 secured to the underside of slide-out room section floor 112, and a pair of ears 284 are mounted to the lower surface of plate 282 so as to extend downwardly therefrom. Each ear 284 has a horizontal passage 286 extending therethrough, and ears 284 are mounted to plate 282 such that passages 286 are in alignment with each other and extend along an axis transverse to the longitudinal axis of inner rail member 126.

Mounting member 266 further includes a threaded shaft 288 mounted at its upper end to a knuckle 290 defining a passage 292. Knuckle 290 is received between ears 284 and passage 292 is aligned with passages 286, and a pivot pin 294 extends through aligned passages 286, 292. Pivot pin 294 has a head 296 at one end which engages one of ears 284, and a snap ring 298 is received within a groove formed in the shank of pin 294 for engaging the other ear 294 so as to maintain pin 294 in engagement with ears 284 and knuckle 290. With this arrangement, mounting member 266 defines a pivot connection between threaded shaft 288 and mounting plate 282, such that shaft 288 is pivotable about a substantially horizontal pivot axis extending transverse to the longitudinal axis defined by inner rail member 126.

As in the embodiment of FIGS. 14–16, mounting member 266 further includes upper and lower jam-type stop nuts 300, 302, respectively, engaged with threaded shaft 288, and upper and lower bearing sleeves 304, 306 engaged by upper and lower stop nuts 300, 302, respectively, with an engagement member 308 disposed between and engaged by upper and lower bearing sleeves 304, 306. A spring 310 bears between engagement member 308 and the upper surface defined by support member lower flange 272. As in prior embodiments, spring 310 functions to bias mounting member 266 upwardly relative to support member 264, to urge slide-out room section 102 upwardly relative to stationary room section floor 164.

Upper and lower passages 278, 280, respectively, have a similar cross-section to upper and lower bearing sleeves 304, 306, respectively, and have a diameter slightly greater than the outside diameter of sleeves 304, 306, respectively. With this construction, there is little lateral movement of mounting member 266 relative to support member 264.

Operation of end condition mounting assembly 170e is similar to that of end condition mounting assemblies 170–170d described previously, with the exception that the pivot connection of mounting member shaft 288 to plate 282 provides the tipping action for slide-out room section 102 during its extension and retraction relative to vehicle 100 as shown in FIG. 19. As in the prior embodiments, the intersection of beveled edge 168 with the upper surface of stationary room section floor 164 acts as a fulcrum for slide-out room section 102 during extension of slide-out room section 102 such that, when slide-out room section 102 attains a certain predetermined position relative to vehicle 100 at which the weight of slide-out room section 102 supported by end condition mounting assembly 170e exceeds that supported by stationary room section floor 164, slide-out room section 102 pivots or tips relative to vehicle 100 about the fulcrum defined by beveled edge 168 and the upper surface of stationary room section floor 164. The pivot connection of shaft 288 to mounting plate 282 accommodates such tipping or pivoting movement of slide-out room section 102. As inner rail members 126 attain their fully extended positions, beveled edge 161 of slide-out room section floor 112 engages and rides along beveled edge 168 of stationary room section floor 164, attaining the complementary flat floor position as illustrated in FIG. 5, wherein the inner end of slide-out room section 102 is lowered and supported relative to the stationary room section of vehicle 100. During retraction of slide-out room section 102, a reverse sequence of events occurs such that slide-out room section 102 pivots about the fulcrum defined by beveled edge 168 and the upper surface of stationary room section floor 164 in a counterclockwise direction at a certain predetermined position of slide-out room section 106 relative to the stationary room section of vehicle 100, at which time the downward force of slide-out room section 102 on end condition mounting assembly 170e is relieved and end condition mounting assembly 170e returns to its position of FIGS. 17 and 18.

In the embodiment of FIGS. 17–19, reinforcing discs 274, 276 function to provide extended passages 278, 280, respectively, relative to the passage depth obtained simply by forming aligned openings in flanges 270, 272, to alleviate binding forces which may otherwise be exerted on bearing sleeves 304, 306.

Figure 20:
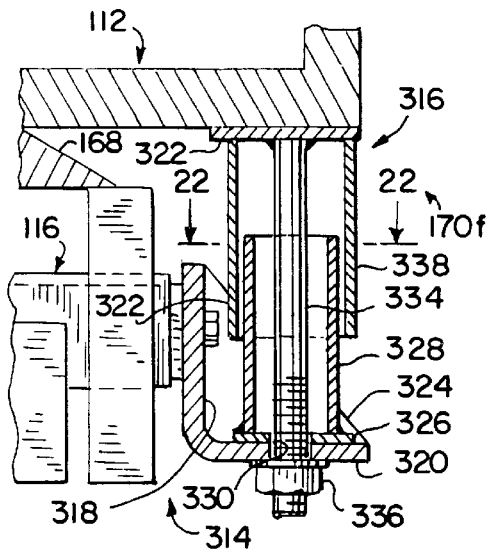
FIGS. 20 and 21 are views similar to FIGS. 6 and 7, respectively, showing an embodiment in which the vertically movable connection arrangement is in the form of a pair of telescoping tubular members.
Figure 21:
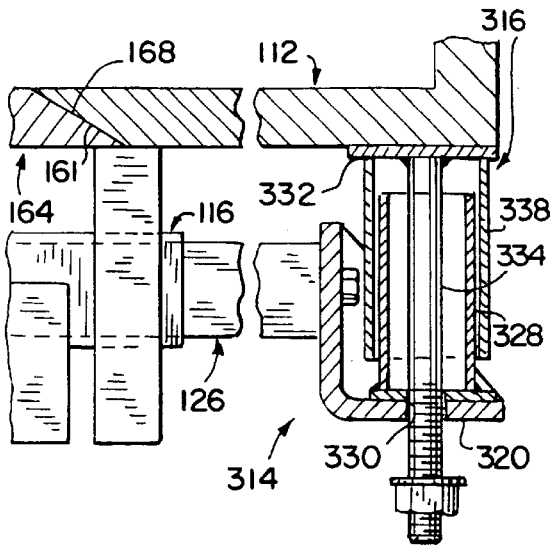
Figure 22:
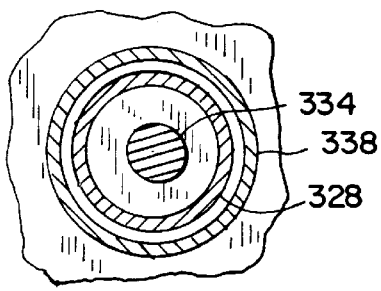
FIG. 22 is a section view taken along line 22—22 of FIG. 20.

FIGS. 20–22 illustrate an alternative end condition mounting assembly 170f for interconnection between slide-out room section 102 and each inner rail member 126. End condition mounting assembly 170f includes a support member 314 and a mounting member 316. Support member 314 is in the form of an L-shaped section having a web 318 and a flange 320, and is mounted to inner rail member 126 via a bolt 322. A pair of reinforcing gussets 324 are welded between web 318 and flange 320.

Support member 314 further includes a disc 326 mounted to the upper surface of flange 320, and an upwardly extending tubular member 328 is mounted at its lower end to disc 326. Disc 326 and flange 320 have aligned openings formed therein which define a vertical passage 330.

Mounting member 316 includes a plate 332 secured to the underside of slide-out room section floor 112, and a vertical shaft 334 is mounted at its upper end to plate 332. Shaft 334 extends through passage 330, which is sized relative to shaft 334 to enable shaft 334 to move angularly relative to lower flange 320. A jam-type stop nut 336 is threadedly engaged with threads located toward the lower end of shaft 334, below flange 320.

Mounting member 316 further includes a tubular member 338 extending downwardly from plate 332 coaxially with shaft 334. Upwardly extending tubular member 328 is received within the passage defined by downwardly extending tubular member 338 and is sized so as to provide a sliding telescoping connection between tubular members 328, 338 and to accommodate a slight angular offset between tubular members 328 and 338.

The sliding telescoping connection provided by tubular members 328, 338 accommodates upward and downward vertical movement of slide-out room section 102 during its retraction and extension relative to vehicle 100, as shown in FIGS. 20 and 21. The overlap between tubular members 328, 338 is sized so as to maintain slide-out room section 102 in a substantially horizontal position until slide-out room section 102 attains its outward tipping position relative to stationary room section floor 164. Otherwise, the inner and outer ends of slide-out room section 102 are lowered and raised during extension and retraction of slide-out room section 102 substantially in the same manner as in the previous embodiments.

Figure 23:
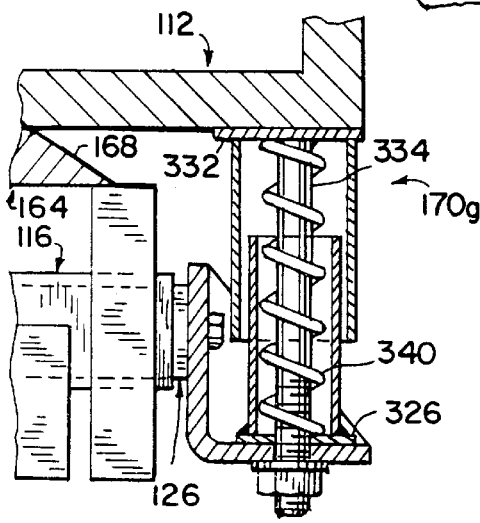
FIGS. 23 and 24 are views similar to FIGS. 20 and 21, respectively, showing an embodiment in which a spring is engaged between the support member and the slide-out room section for biasing the slide-out room section upwardly.
Figure 24:
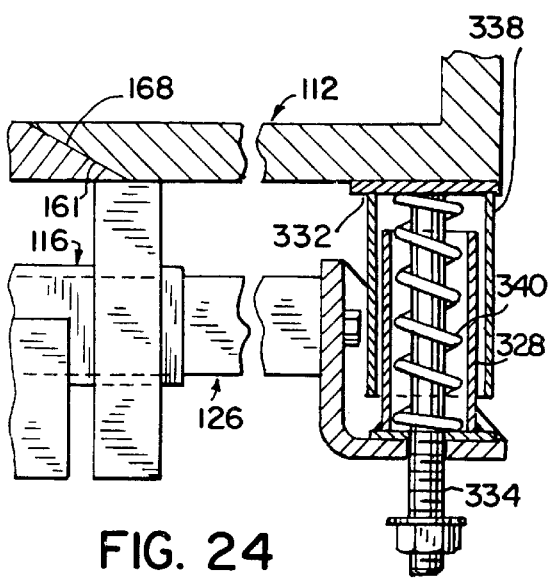

FIGS. 23 and 24 illustrate an end condition mounting assembly 170g which includes the same components as end condition mounting assembly 170f, and like reference characters will be used to facilitate clarity. End condition mounting assembly 170g includes a spring 340 through which shaft 334 extends and which bears between mounting plate 332 and disc 326. Spring 340 functions as described previously, to assist in raising the outer end of slide-out room section 102 as slide-out room section 102 is moved away from its fully extended position toward its retracted position. When slide-out room section 102 is fully extended as shown in FIG. 24, spring 334 is compressed under the weight of the outer end of slide-out room section 102.

FIGS. 25–28 show an alternative end condition mounting assembly 170h for interconnection between each inner rail member 126 and slide-out room section 102. As in the prior embodiments, end condition mounting assembly 170h includes a support member 344 secured to inner rail member 126, and a mounting member 346 secured to slide-out room section floor 112.

Figure 25:
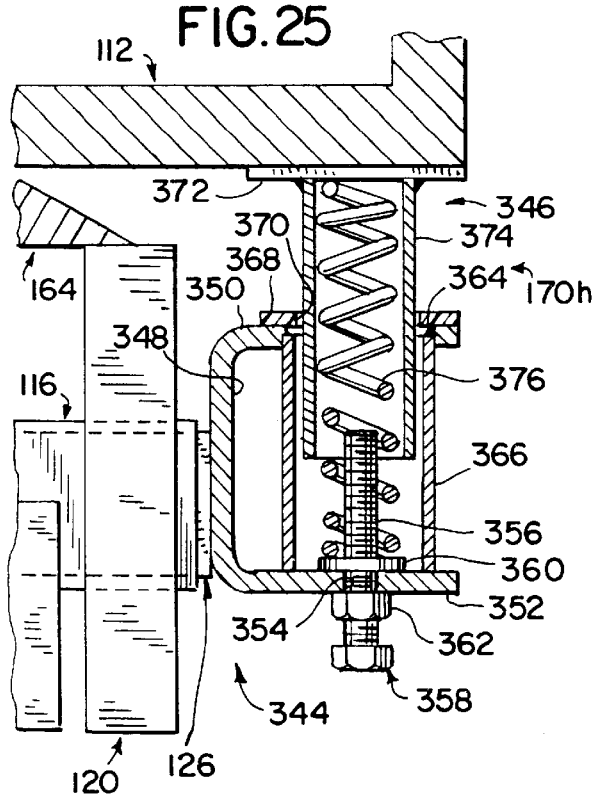
FIG. 25 is a view similar to FIG. 6, showing an alternative telescoping arrangement for the vertically movable connection between the slide-out room section and the extension member.

Support member 344 is in the form of a C-shaped section having a web 348 mounted such as by welding to the outer end of inner rail member 126, and flanges 350, 352 extending outwardly from the upper and lower ends, respectively, of web 348. An opening 354 is formed in lower flange 352, and the threaded shank 356 of a bolt 358 extends through opening 354. An engagement member 360 is fixed to bolt shank 356, and a jam-type adjustment nut 362 is mounted such as by welding to the lower surface of lower flange 352 such that its threaded internal passage is in alignment with opening 354. With this arrangement, bolt 358 can be turned relative to adjustment nut 362 so as to move engagement member 360 upwardly and downwardly relative to lower flange 352. FIG. 25 illustrates engagement member 360 in its lowermost position.

An opening 364 is formed in support member upper flange 350, and a tubular member 366 has an upper end received within opening 364 and secured to upper flange 350 such as by welding of the upper end of tubular member 366 to the wall of opening 364. The lower end of tubular member 366 is engaged with the upper surface of lower flange 352, and is also secured thereto such as by welding. A plate 368 is mounted to the upper surface of upper flange 350, and an oval opening 370 is formed in plate 368. Opening 370 is located above and coaxially relative to opening 364 in flange 350.

Mounting member 346 includes a plate 372 secured to the underside of slide-out room section floor 112, and a tubular member 374 is mounted to plate 372 at its upper end such as by welding. Tubular member 374 extends vertically downwardly through opening 370 in plate 368, and is received within the passage defined by tubular member 366. Tubular member 374 is sized so as to provide a gap between the outer wall of tubular member 374 and the inner wall of tubular member 366, and also between the ends of opening 370 and the outer wall of tubular member 372.

A spring 376 defines a lower end which bears against engagement member 360, and an upper end which bears against the lower surface of mounting plate 372. As in the prior embodiments, spring 376 functions to bias mounting member 346 upwardly relative to support member 344, to urge slide-out room section 102 toward its raised position relative to the stationary room section of vehicle 100. The biasing force exerted by spring 376 can be adjusted by turning bolt 358 relative to adjustment nut 362, to raise and lower engagement member 360 relative to mounting plate 372.

Figure 26:
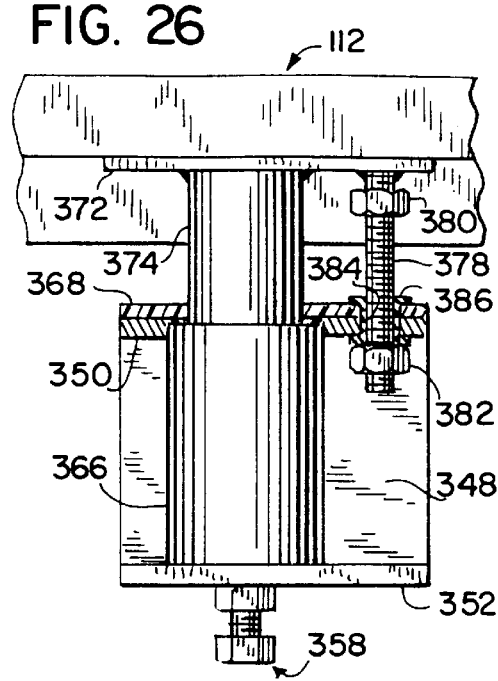
FIG. 26 is a partial transverse section of the embodiment of FIG. 25 showing a stop arrangement incorporated therein.
Figure 27:
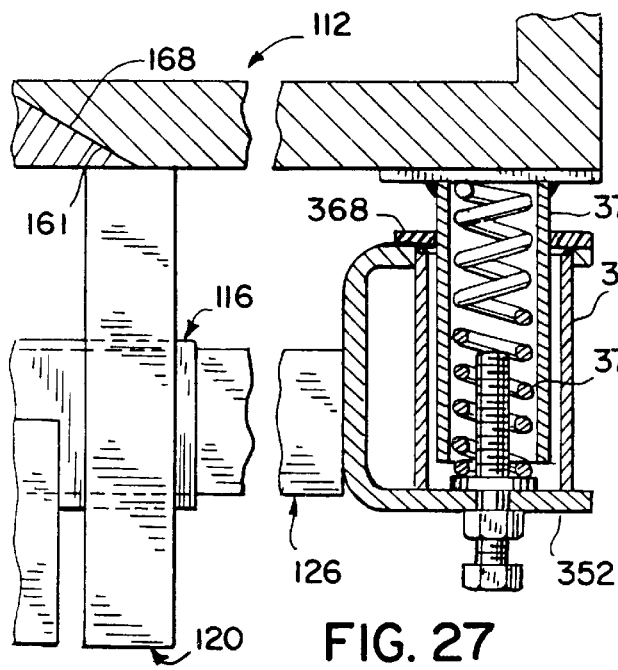
FIG. 27 is a view similar to FIG. 25, showing the slide-out room section in its lowered position.
Figure 28:
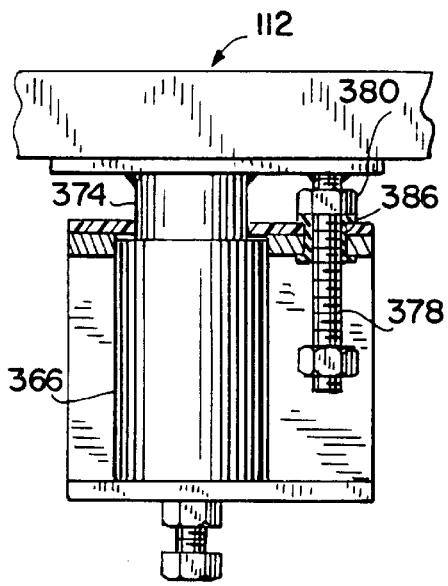
FIG. 28 is a view similar to FIG. 26, showing the slide-out room section in its lowered position of FIG. 27.
Figure 39:
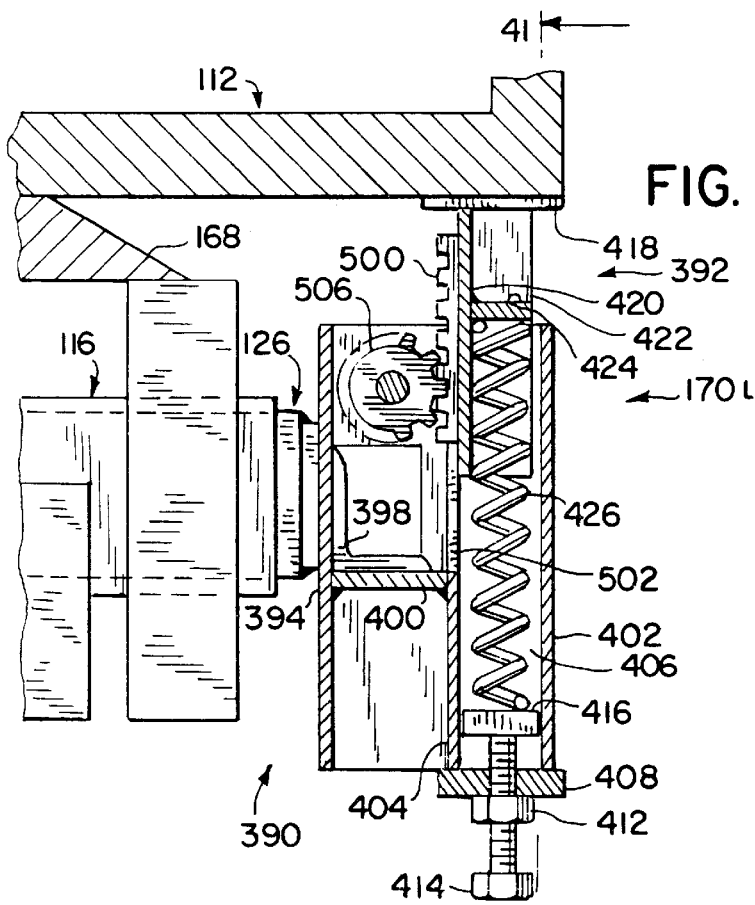
FIGS. 39 and 40 are views similar to FIGS. 6 and 7, respectively, showing an alternative embodiment for the vertically movable connection arrangement incorporating a synchronizing pinion and a spring.
Figure 40:
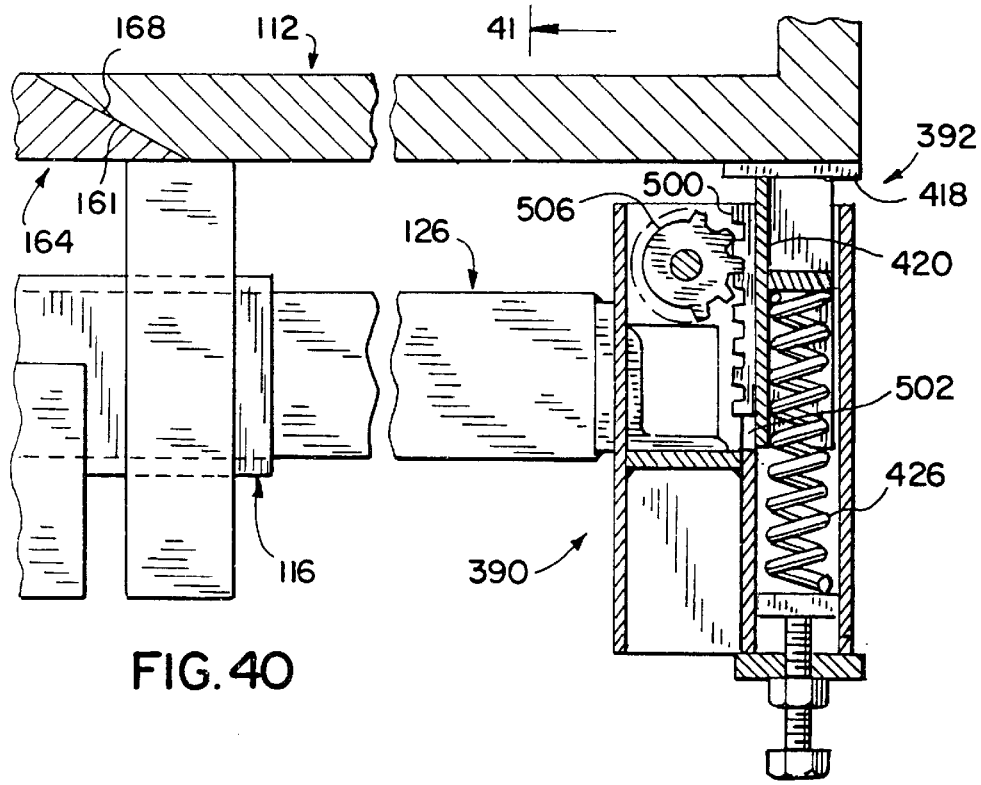

Upper tubular member 374 is movable within opening 370 in plate 368 so as to provide sliding vertical movement of the outer end of slide-out room section 102 between its raised position of FIGS. 25 and 26 and its lowered position of FIGS. 27 and 28. The gap between upper tubular member 374 and lower tubular member 366 accommodates a slight amount of angular movement or tipping of slide-out room section 102 during extension and retraction as described previously, and opening 370 in plate 368 also accommodates such movement of upper tubular member 374.

As shown in FIGS. 26 and 28, a threaded stop rod 378 is mounted at its upper end to mounting plate 372, extending vertically downwardly therefrom. Upper and lower jam-type stop nuts 380, 382, respectively are threadedly engaged with stop rod 378. Aligned openings are formed in plate 368 and upper flange 350 to define a passage 384 within which a bearing sleeve 386 is received. Sleeve 386 includes upper and lower rings engageable with the upper surface of plate 368 and the lower surface of flange 350, respectively, for maintaining sleeve 386 in position within passage 384. With this arrangement, engagement of upper stop nut 380 with the upper surface of plate 368 through the upper ring of sleeve 384 functions to support slide-out room section 102 when fully extended and in its lowered position, as shown in FIG. 28. Likewise, engagement of lower stop nut 382 with the lower surface of flange 350 through the lower ring of sleeve 384 limits the upward movement of slide-out room section 102 relative to vehicle 100, as shown in FIG. 26.

FIGS. 29–31 illustrate an alternative end condition mounting assembly 170i for interconnection between slide-out room section 102 and each inner rail member 126. End condition mounting assembly 170i includes a support member 390 and a mounting member 392.

Support member 390 is in the form of a box-like member including an inner plate 394 mounted to the outer end of inner rail member 126 and extending between a pair of side plates 396. A reinforcing angle member 398 and a horizontal reinforcing plate 400 also extend between and are interconnected with side plates 396. An outer plate 402 extends between and is interconnected with the outer ends of side plates 396, and an intermediate plate 404 is disposed between outer plate 402 and inner plate 394. Intermediate plate 404 extends between and is interconnected with side plates 396, and reinforcing plate 400 is mounted at its outer end to intermediate plate 404. Outer plate 402 and intermediate plate 404 define an upwardly opening vertically extending passage 406, which is closed at its lower end by a bottom plate 408 secured such as by welding to side plates 396, outer plate 402 and intermediate plate 404. A pair of passages 410 are formed in bottom plate 408, and jam-type adjustment nuts 412 are welded to the lower surface of bottom plate 408 such that the threaded passage of each nut 412 is in alignment with one of openings 410. A pair of adjustment bolts 414 have threaded shanks which engage adjustment nuts 412, and an engagement plate 416 is mounted to the ends of the shanks of adjustment bolts 414. With this arrangement, bolts 414 can be turned relative to adjustment nuts 412 so as to vary the vertical position of engagement plate 416 relative to bottom plate 408.

Mounting member 392 includes a mounting plate 418 secured to the underside of slide-out room section 412 at its outer end. An inner plate 420 is mounted to and extends vertically downwardly from mounting plate 418, and a pair of side plates 422 are mounted to the side edges of inner plate 420 to define a three-sided mounting structure slidably received within passage 406 for telescoping movement relative to support member 390. The overall width defined by side plates 422 as mounted to the end edges of inner plate 420 is slightly smaller than the overall width of passage 406 as shown in FIG. 31, for providing such telescoping movement of mounting member 392 relative to support member 390. The overall depth of side plates 422 is less than that of passage 406 to define a gap for accommodating angular offset of mounting member 392 relative to support member passage 406.

A horizontal upper engagement plate 424 is secured at its ends to side plates 422 and at an inner edge thereof to inner plate 420. A pair of springs 426 each have a lower end in engagement with lower engagement plate 416 and an upper end engaged with upper engagement plate 424. Springs 426 function to bias mounting member 392 upwardly relative to support member 390, to urge slide-out room section 102 toward its raised position relative to the stationary room section of vehicle 100 to which slide-out room section 102 is mounted.

In operation, end condition mounting assembly 170i functions similarly to the previously-described embodiments. The overlap between mounting member 392 and support member 390 within passage 406 functions to maintain slide-out room section floor 112 in its raised position until slide-out room section 102 attains its tipping position relative to stationary room section floor 164, as slide-out room section 102 is moved toward its extended position. Mounting member 392 then tips relative to support member 390, and the inner and outer ends of slide-out room section 102 are fully lowered when slide-out room section 102 is fully extended, to attain the flat floor position of slide-out room section 102 as illustrated in FIG. 30 in which the weight of the outer end of slide-out room section 102 overcomes the biasing force of springs 426 to lower mounting member 392 relative to support member 390. While not illustrated in FIGS. 29–31, a stop arrangement similar to that illustrated in FIGS. 26 and 28 with respect to end condition mounting assembly 170h is provided in the embodiment of FIGS. 29–31, for limiting the range of vertical movement of slide-out room section 102 and supporting slide-out room section 102 in its fully extended position. Upon retraction of slide-out room section 102, springs 426 function to assist in raising the outer end of slide-out room section 102 as slide-out room section floor 112 rides upwardly along beveled edge 168 of stationary room section floor 164, to move slide-out room section 102 to its raised position and enable retraction of slide-out room section 102 within the stationary room section of vehicle 100. The position of lower engagement plate 416 can be adjusted vertically by turning adjustment bolts 414, in order to adjust the biasing force exerted by springs 426 on mounting member 392.

FIGS. 32–35 illustrate an alternative end condition mounting assembly 170j for interconnection between slide-out room section 102 and each inner rail member 126. As in the prior embodiments, end condition mounting assembly 170j includes a support member 430 mounted to inner rail member 126 and a mounting member 432 mounted to slide-out room section 102.

Support member 430 includes an L-shaped member defining a vertical wall 434 mounted via a bolt 436 to the outer end of inner rail member 126, and a lower horizontal wall 438 extending outwardly therefrom. A pair of spaced vertical support plates 440 are mounted to the lower surface of lower horizontal wall 438, extending downwardly therefrom.

Mounting member 430 further includes an upwardly open box-like structure secured to the outer edges of support plates 440 and to lower horizontal wall 438, defined by parallel vertical inner and outer walls 442, 444, respectively, and side walls 446 extending between inner and outer walls 442, 444. Walls 442–446 cooperate to define a vertical passage 448, which is open at its upper end and closed at its lower end by a bottom plate 450 mounted to the lower edges of walls 442–446. Vertical passages 452 are formed in bottom plate 450, and adjustment nuts 454 are mounted to the lower surface of bottom plate 450 such that the internally threaded passage of each adjustment nut 454 is in vertical alignment with one of openings 452. The threaded shank of each of a pair of bolts 456 is engaged with the internal threads of one of adjustment nuts 454, extending upwardly through one of openings 452 such that the upper end of each bolt shank is disposed within passage 448 above the upper surface of lower plate 450.

Mounting member 432 includes a mounting plate 458 secured to the underside of slide-out room section floor 112. A box-like frame assembly 460 is mounted at its upper end to mounting plate 458. Frame assembly 460 includes an inner plate 462, a pair of side plates 464 and a bottom plate 466. Side plates 464 have a depth less than the depth of passage 448, as shown in FIG. 32, and likewise inner plate 462 has a width less than width of passage 448, as shown in FIG. 34.

A pair of vertically spaced roller assemblies are mounted to frame assembly 460. Each roller assembly includes an axle 468 extending through horizontally aligned openings in side plates 464 and extending outwardly therefrom. A roller 470 is mounted to each end of each axle 468, and rollers 470 are located in the space between each side plate 464 and side walls 446. Each axle 468 is rotatably mounted relative to frame assembly 460, such that rollers 470 are also rotatable relative to frame assembly 460.

Rollers 470 have a diameter less than the depth of passage 448 as shown in FIG. 32, such that rollers 470 accommodate angular movement of mounting member 432 relative to passage 448.

In operation, end condition mounting assembly 170 functions similarly to the previously-described embodiments during extension and retraction of slide-out room section 102. As slide-out room section 102 is moved from its retracted position of FIG. 32 toward its extended position of FIG. 33, rollers 470 slide along the inside surfaces of inner and outer walls 442, 444 so as to drop the outer end of slide-out room section 102 as slide-out room section 102 pivots to its tipped position relative to stationary room section floor 164. The flat floor condition of FIG. 33 is attained when slide-out room section 102 is fully extended and beveled edges 161, 168 ar engaged with each other. The shank ends of bolts 456 engage frame assembly bottom plate 466 as frame assembly 460 is moved downwardly within passage 448 under the weight of slide-out room section 102, so as to support the outer end of slide-out room section 102 when fully extended, as shown in FIG. 33. The adjustability of bolts 456 relative to bottom plate 450 provides adjustment in the vertical position at which bolts 456 engage frame assembly bottom plate 466, to enable the installer or operator to ensure that slide-out room section floor 112 is flat and level relative to stationary room section floor 164 when slide-out room section 102 is fully extended. Upon movement of slide-out room section 102 toward its retracted position, rollers 470 ride upwardly along the inside surfaces of inner and outer walls 442, 444 to enable slide-out room section 102 to be moved to its raised position for providing retraction of slide-out room section 102 relative to vehicle 100.

FIGS. 36–38 illustrate an alternative end condition mounting assembly 170k for interconnection between slide-out room section 102 and each inner rail member 126. End condition mounting assembly 170k is similar in its construction to end condition mounting assembly 170j, and like reference characters will be used where possible to facilitate clarity. Generally, end condition mounting assembly 170k includes support member 430 constructed substantially identically to support member 430 of end condition mounting assembly 170j and mounted to the end of inner rail member 126, and a mounting member 472 secured to slide-out room section 102.

Support member 430 of end condition mounting assembly 170k varies from support member 430 of end condition mounting assembly 170j only in that end condition mounting assembly 170k includes an engagement plate 474 mounted to the upper ends of bolts 456 within passage 448.

Mounting member 472 includes a mounting plate 476 secured to the underside of slide-out room section floor 112, and a frame assembly 478 mounted at its upper end to mounting plate 476 and extending vertically downwardly therefrom. Frame assembly 478 includes an inner plate 480 and a pair of side plates 482 between which inner plate 480 extends. Frame assembly 478 further includes an upper engagement plate 484 extending between side plates 482 and interconnected therewith, and also interconnected with the lower edge of inner plate 480. Side plates 482 extend downwardly past upper engagement plate 484, defining roller mounting extensions 486 disposed within passage 448 and located inwardly of passage side walls 446. As shown in FIG. 36, side plates 482 and extensions 486 have a depth less than that of passage 448 to define a gap therebetween.

A pair of vertically spaced stub shafts 488, each of which has a head 490, are mounted to each side plate extension 486. A roller 492 is rotatably mounted to each stub shaft 488, and rollers 492 are located within the space between each side plate extension 486 and the adjacent side wall 446. As in the embodiment of FIGS. 32–35, each roller 492 has a diameter less than the depth of passage 448 so as to accommodate angular movement of mounting member 472 relative to support member 430.

A pair of springs 494 are disposed within passage 448. Each spring 494 defines a lower end in engagement with lower engagement plate 474 and an upper end in engagement with upper engagement plate 484. As in prior embodiments, springs 494 function to bias mounting member 472 upwardly relative to support member 430, to urge slide-out room section 102 toward its raised position relative to vehicle 100.

In operation, end condition mounting assembly 170k functions substantially identically to end condition mounting assembly 170j to provide upward and downward movement of slide-out room section 102 relative to the stationary room section of vehicle 100 to which slide-out room section 102 is mounted. Bolts 456 can be adjusted relative to bottom plate 450 to vary the biasing force exerted by springs 494 against mounting member 472.

While not shown in FIGS. 36–38, a satisfactory stop structure, such as that illustrated in FIGS. 26 and 28, is interposed between support member 430 and mounting member 472 for controlling the range of vertical movement of slide-out room section 102 and for supporting mounting member 472 when lowered relative to support member 430 when slide-out room section 102 is in its lowered position.

FIGS. 39–42 illustrate an end condition mounting assembly 170l for interconnection between slide-out room section 102 and each inner rail member 126. End condition mounting assembly 170l is similar in its construction and operation to end condition mounting assembly 170i illustrated in FIGS. 29–31, and like reference characters will be used where possible to facilitate clarity. As in the embodiment of FIGS. 29–31, end condition mounting assembly 170l includes a support member 390 and a mounting member 392.

End condition mounting assembly 170l contemplates the addition of a gear rack 500 mounted to the inner surface of inner plate 420 toward its upper end. Gear rack 500 is substantially vertical, and is received within an upwardly opening vertical gap 502 formed in intermediate plate 404, facing inwardly and extending between horizontal plate 400 and the upper end of intermediate plate 404. As shown in FIG. 41, a drive shaft 504 extends between the end condition mounting assemblies 170l, and is rotatably supported by the facing side plates 396 thereof. A pinion 506 is fixed to each end of drive shaft 504, and each pinion 506 defines gear teeth engageable with the teeth of gear rack 500.

FIG. 42 illustrates the construction details of drive shaft 504, gear rack 500 and pinion 506. As shown, drive shaft 504 is tubular in construction, and a pinion mounting shaft 508 extends into the end of drive shaft 504 and is non-rotatably fixed thereto via a pin 510. Pinion mounting shaft 508 extends through a bearing 512 mounted to each side plate 396, and pinion mounting shaft 508 is maintained in position relative to bearing collars 512 via pins 514. Pinion mounting shaft 508 extends through an opening formed in pinion 506, and pinion 506 is non-rotatably secured to pinion mounting shaft 508 in any conventional manner.

Drive shaft 504 and pinions 506 function to ensure that end condition mounting assemblies 170l are synchronously raised and lowered. Specifically, it is contemplated that end condition mounting assembly 170l will be employed when one side of slide-out room section 102 is significantly more heavily loaded than the other. This ensures that both sides of slide-out room section 102 are raised and lowered at the same time, to prevent skewing of slide-out room section 102 which may otherwise occur if the more heavily loaded side of slide-out room section 102 were to drop prior to the less loaded side of slide-out room section 102 when slide-out room section 102 is extended, and when the more heavily loaded side of slide-out room section 102 resists movement to its raised position during retraction of slide-out room section 102. When the more heavily loaded side of slide-out room section 102 begins its vertical movement relative to inner rail member 126, either during extension or retraction, such movement is transferred through drive shaft 504 and pinions 506 to the other end condition mounting assembly 170*l*, to provide simultaneous raising and lowering of slide-out room section 102 relative to inner rail members 126.

In this embodiment, side plates 422 again have a depth less than that of passage 406, to accommodate angular offset of mounting member 392 relative to support member 390 when slide-out room section 102 pivots or tips relative to stationary room section floor 164 during extension or retraction. The gap defined between side plates 422 and outer and intermediate plates 402, 404, which define passage 406, is less than the depth of the gear teeth of bracket 500 and pinion 506, to ensure that the teeth of pinion 506 do not become disengaged from the teeth of gear rack 500 during angular movement of mounting member 392 relative to support member 390.

In all other respects, end condition mounting assembly 170*l* functions the same as end condition mounting assembly 170*i* shown and described with respect to FIGS. 29–31.

FIGS. 43–46 show an alternative end condition mounting assembly 170*m* for interconnection between slide-out room section 102 and each inner rail member 126. End condition mounting assembly 170*m* is similar in its construction to end condition mounting assembly 170*j* illustrated in FIGS. 32–35, and like reference characters will be used where possible to facilitate clarity. End condition mounting assembly 170*m* includes support member 430 mounted to the end of inner rail member 126 and mounting member 432 secured to the underside of slide-out room section floor 112.

Figure 43:
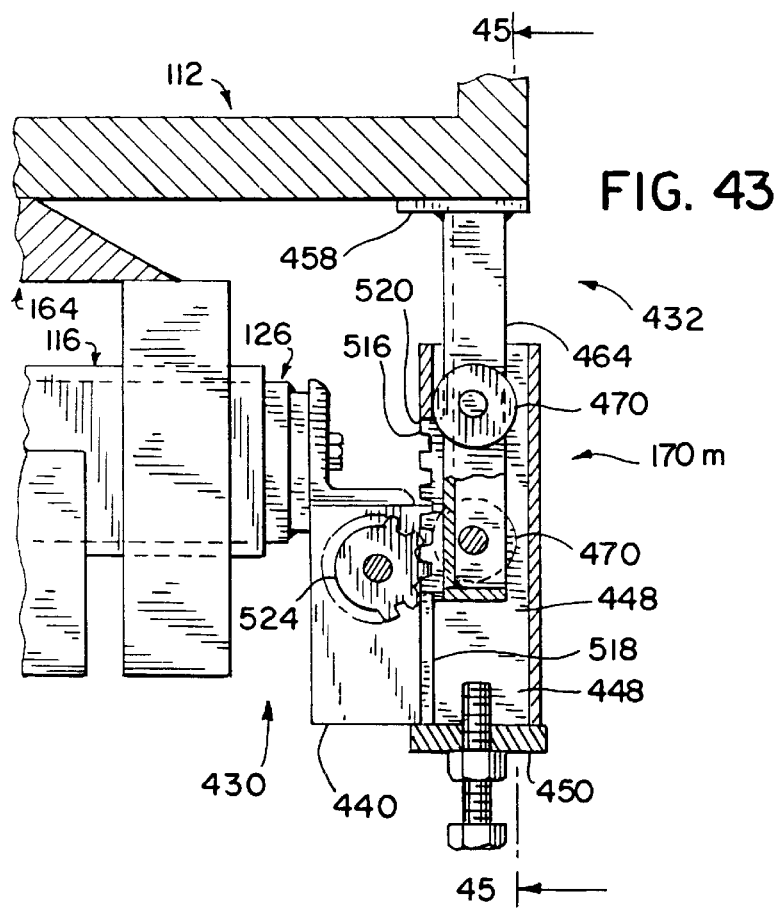
FIGS. 43 and 44 are views similar to FIGS. 39 and 40, respectively, showing an alternative embodiment incorporating rollers mounted to the mounting members and received within passages defined by the support members.
Figure 44:
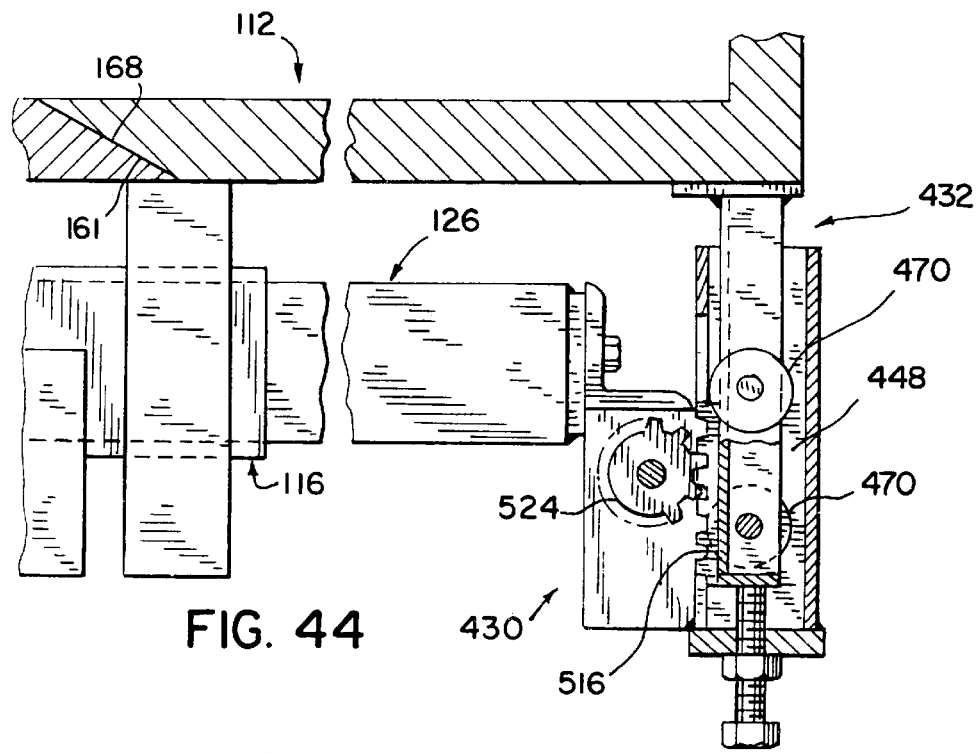

End condition mounting assembly 170*m* varies from end condition mounting assembly 170*j* in that a vertical gear rack 516 is mounted to the inner surface of mounting member inner plate 462. Gear rack 516 faces inwardly and is vertically movable within a gap 518 formed in support member inner wall 442, which extends vertically upwardly from bottom plate 450 and terminates in an upper end 520 (FIGS. 43, 45).

A drive shaft 522 extends between end condition mounting assemblies 170*m* and is rotatably supported at its ends by support plates 440. As shown in FIG. 46, drive shaft 522 is interconnected with support plates 440 in the same manner as drive shaft 504 of end condition mounting assembly 170*l*, incorporating pinion mounting shaft 508 mounted to drive shaft 522 via pin 510 and bearing collars 512 received within openings formed in support plates 440 for rotatably supporting pinion mounting shaft 508. Again, pins 514 maintain pinion mounting shaft 508 in position relative to support plates 440.

A drive pinion 524 is non-rotatably mounted to each pinion mounting shaft 508 and includes gear teeth engaged with the vertically spaced teeth of each gear rack 516 of end condition mounting assembly 170*m*. The basic components of end condition mounting assembly 170*m* function the same as those of end condition mounting assembly 170*j* shown and described with respect to FIGS. 32–34, to provide raising and lowering of slide-out room section 102 relative to inner rail member 126 upon retraction and extension of slide-out room section 102. Drive shaft 522, pinions 524 and gear racks 516 function the same as end condition mounting assembly 170*l* shown and described with respect to FIGS. 39–42 to ensure that both end condition mounting assemblies 170*m* are raised and lowered synchronously in the event one side of slide-out room section 102 is more heavily loaded than the other. As in end condition mounting assembly 170*j*, rollers 470 have a diameter less than the depth of passage 448 to accommodate angular offset of mounting member 432 relative to support member 430. The depth of the teeth of pinion 524 and the teeth of gear rack 516 is greater than the difference between the depth of passage 448 and the diameter of rollers 470, to ensure that the teeth of pinion 524 do not become disengaged from gear rack 516 during such angular movement of mounting member 432 relative to support member 430.

Figure 47:
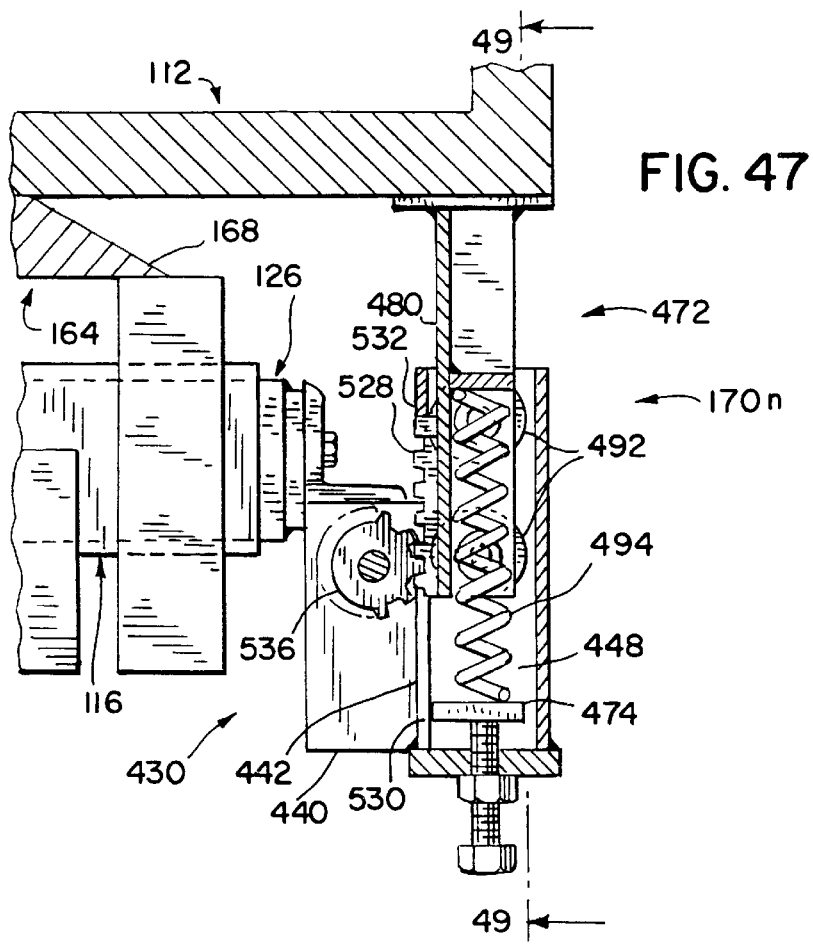
FIGS. 47 and 48 are views similar to FIGS. 43 and 44, respectively, showing an embodiment in which a spring is interposed between the mounting member and the support member for biasing the slide-out room section upwardly.
Figure 48:
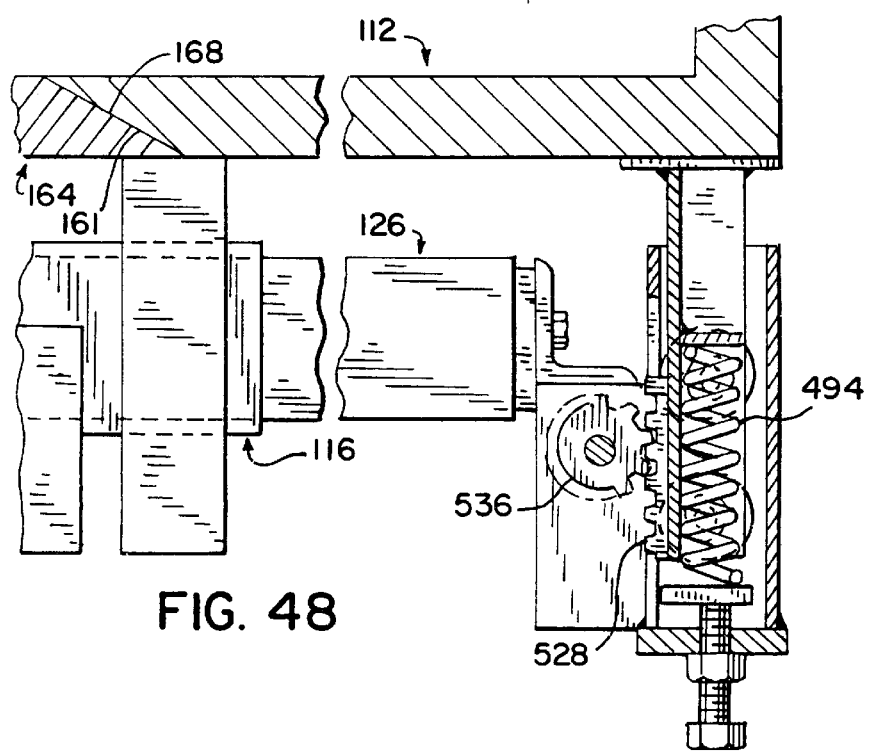
Figure 49:
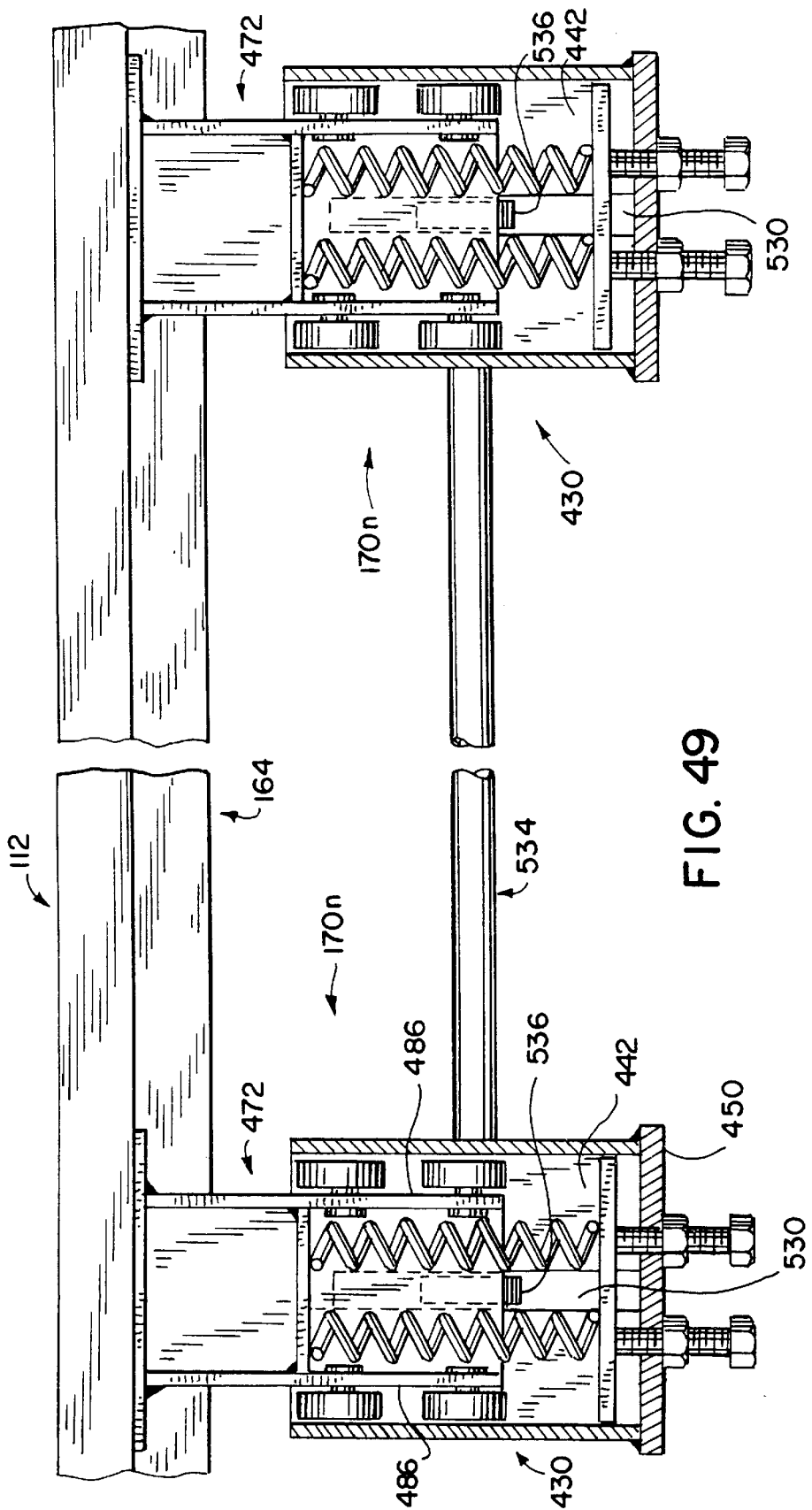
FIG. 49 is a partial section view taken along line 49—49 of FIG. 47.

FIGS. 47–49 illustrate an alternative end condition mounting assembly 170*n* for interconnection between slide-out room section 102 and each inner rail member 126. End condition mounting assembly 170*n* incorporates end condition mounting assembly 170*k* illustrated in FIGS. 36–38, and like reference characters will be used to facilitate clarity.

End condition mounting assembly 170*n* varies from end condition mounting assembly 170*k* in that inner plate 480 extends the full height of frame assembly 478, and a gear rack 528 is mounted to the inner surface of inner plate 480 between side plate extensions 486. A vertical gap 530 is formed in support member inner wall 442, extending upwardly from bottom plate 450 and terminating in an upper end 532. Gear rack 528 extends through and is received within gap 530, facing inwardly and defining a series of vertically spaced gear teeth.

A drive shaft 534 extends between and is rotatably supported by end condition mounting assemblies 170*n*. Drive shaft 534 has the same construction and mounting arrangement as drive shaft 522 of end condition mounting assembly 170*m* and drive shaft 504 of end condition mounting assembly 170*l*, for drivingly interconnecting a pair of drive pinions 536 mounted to the ends of drive shaft 534 and having teeth engaged with the teeth of each gear rack 528.

The operation of the basic components of end condition mounting assembly 170*n* is the same as described with respect to end condition mounting assembly 170*k* of FIGS. 36–38, to provide raising and lowering of slide-out room section 102 relative to the stationary room section of vehicle 100 to which slide-out room section 102 is mounted. Drive shaft 534, drive pinions 536 and gear racks 528 function the same as in end condition mounting assemblies 170*l* and 170*m* of FIGS. 39–42 and FIGS. 43–46, respectively, for providing synchronization between the end condition mounting assemblies 170*n* when one side of slide-out room section 102 is more heavily loaded than the other.

FIGS. 50–52 illustrate a modified end condition mounting assembly 170*p* nearly identical in construction and operation to end condition mounting assembly 170*m* shown and described in FIGS. 43–46. End condition mounting assembly 170*p* includes drive shaft 522 which interconnects drive pinions 524, and drive pinions 524 are engaged with the vertically spaced teeth of gear rack 516 secured to mounting member inner wall 462. The embodiment of FIGS. 50–52 shows support plates 440 formed integrally with a pair of inner wall sections 538, which are spaced apart so as to define the gap within which gear rack 516 is vertically movable. Inner wall sections 538 are in turn formed integrally with spaced side wall sections 540, which overlap side wall sections 542 formed integrally with support member outer wall 444. The overlapping side wall sections 540, 542 are secured together such as by spot welding or the like, to define passage 448 within which rollers 470 are received. Again, drive shaft 522, pinions 524 and gear rack 516 synchronize upward and downward movement of end condition mounting assemblies 170p when slide-out room section 102 is raised and lowered and one side of slide-out room section 102 is more heavily loaded than the other.

FIG. 52 also illustrates a seal support 544 sandwiched between vehicle frame member 120 and stationary room section floor 164. Seal support 544 includes an extension 546 defining a channel 548, and a seal 550 is mounted to the upper surface of extension 546 outwardly of channel 548. As shown in FIG. 51, seal 550 engages the underside of slide-out room section floor 112 when slide-out room section 102 is in its extended position and lowered, to prevent seepage of air or water into the interior of vehicle 10.

While seal support 544 and seal 550 have only been shown and described with reference to the embodiment of FIGS. 50–52, it is understood that seal support 544 and seal 550 can be incorporated into any of the embodiments shown and described.

In addition, it is understood that a synchronizing drive shaft and rack and pinion arrangement can be used in any of the illustrated embodiments and is not limited to use in combination with the embodiments shown and described with respect to FIGS. 39–52.

FIGS. 53a–53d and 54a–54d show two embodiments of a lifting arrangement for positively moving slide-out section 102 to its fully raised position relative to the stationary room section of vehicle 100 to which slide-out room section 102 is mounted. As shown in FIGS. 53a–53d, a stationary track 550 is secured to the underside of stationary room section floor 164 adjacent its outer end, and is supported by structural frame member 120. Track 550 extends outwardly of the outer end of stationary room section floor 164, and has an upper surface coplanar with the lower surface of stationary room section floor 164. Track 550 defines an outer end 552. A pair of wheel assemblies 554, 556 are mounted to the underside of slide-out room section floor 112. Inner wheel assembly 554 includes a bracket 558 mounted to the underside of slide-out room section floor 112 and a wheel 560 rotatably mounted thereto. Similarly, wheel assembly 556 includes a bracket 562 mounted to the underside of slide-out room section floor 112, and a wheel 564 rotatably mounted thereto.

Figure 53A:
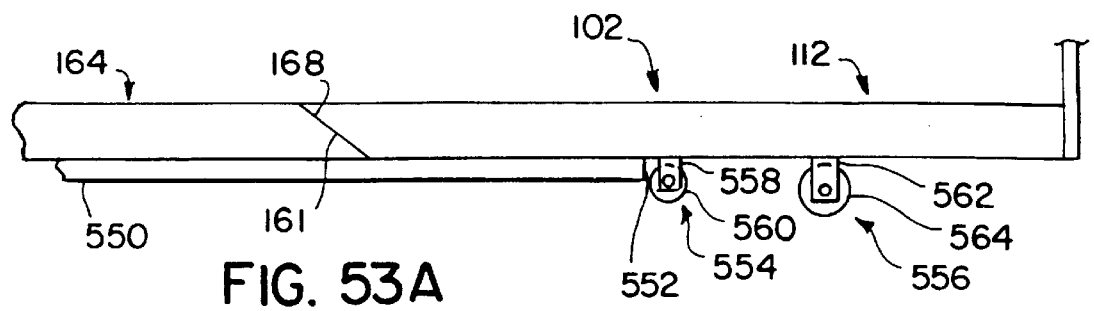
FIGS. 53a–53d are schematic sectional views showing a lifting arrangement for moving the movable room section to its fully raised position.
Figure 53B:
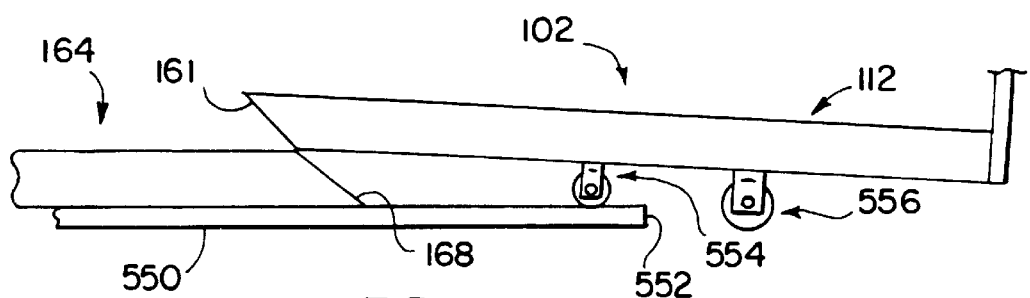
Figure 53C:
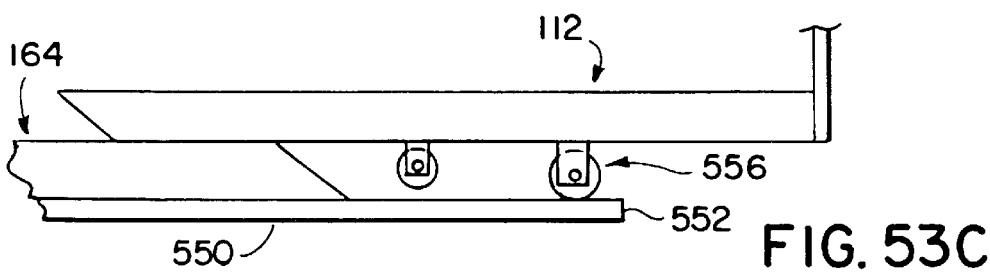
Figure 53D:
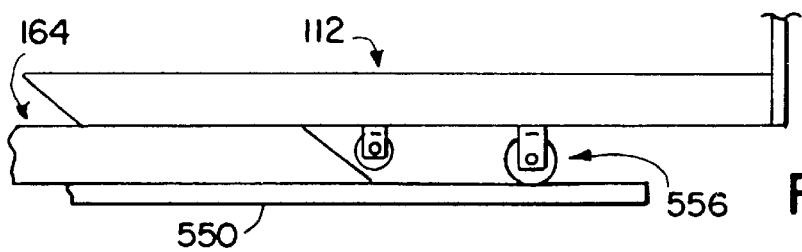
Figure 54A:
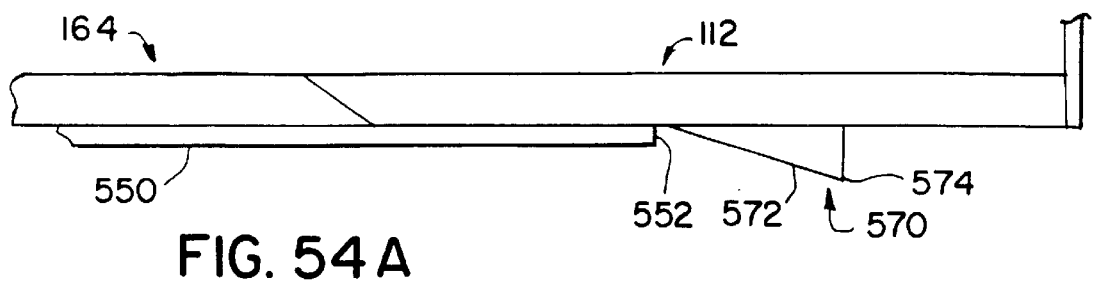
FIGS. 54a–54d are views similar to FIGS. 53a–53d showing an alternative embodiment of the lifting arrangement.
Figure 54B:
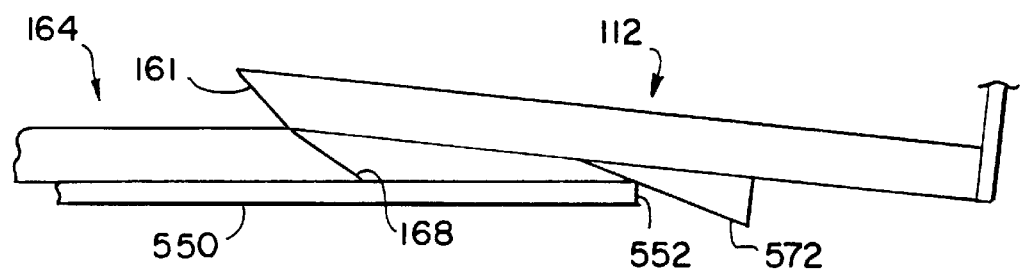
Figure 54C:
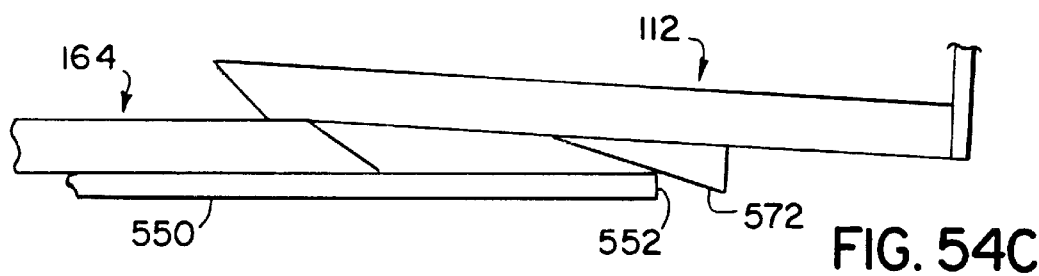
Figure 54D:
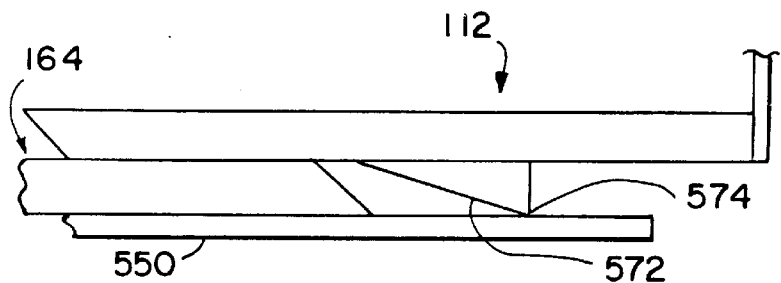

FIG. 53a shows slide-out section 102 in its fully extended position, in which the upper surfaces of slide-out room section floor 112 and stationary room section floor 164 are substantially coplanar. As operating mechanism 114 is operated to retract inner rail members 126 and to move slide-out room section 102 toward its retracted position, beveled edge 161 of slide-out room section floor 112 rides upwardly along beveled edge 168 of stationary room section floor 164 to the position of FIG. 53b, and simultaneously wheel 560 of wheel assembly 554 engages and rides along the upper surface of track 550. As retraction of slide-out room section 102 continues, wheel 564 of wheel assembly 556 engages the upper surface of track 550, to bring slide-out room section floor 112 to its fully raised position relative to stationary room section floor 164, such that slide-out room section floor 112 is disposed substantially parallel to stationary room section floor 164. In this manner, the inner end of slide-out room section 102 is supported by engagement of the underside of slide-out room section floor 112 with the upper surface of stationary room section floor 164, while the outer end of slide-out room section 102 is supported by engagement of wheel 564 with track 550. Retraction of inner rail members 126 continues until slide-out room section 102 assumes its fully retracted position of FIG. 53d.

During extension of slide-out room section 102, the reverse sequence of steps occurs such that slide-out room section 102 is gradually dropped relative to stationary room section floor 164 by wheels 564 and 560 rolling off track 550 as slide-out room section 102 approaches its fully extended position. This functions to ease the transition of slide-out room section 102 from its fully raised position to its fully lowered position, to alleviate stress on the various end condition mounting assemblies which interconnect inner rail member 126 with slide-out room section 102.

FIGS. 53a–53d illustrate a single track 550 and associated roller assemblies 554 and 556. In an embodiment such as this, track 550 is located in the center of slide-out room section 102. It is contemplated that any number of tracks 550 and associated wheel assemblies 554, 556 could be located at intervals along the length of slide-out room section 102.

FIGS. 54a–54d show an alternative lifting arrangement to that illustrated in FIGS. 53a–53d. In this embodiment, a wedge member 570 is mounted to the underside of slide-out room section floor 112. Wedge member 570 includes a ramped surface 572 which engages outer end 552 of track 550 and which rides along the upper surface of track 550 to raise the outer end of slide-out room section 102 to its fully elevated position during retraction. Ramped surface 552 terminates in a lower end 574 which, when engaged with the upper surface of track 550, functions to position slide-out room section floor 112 parallel to stationary room section floor 164. Upon movement of slide-out room section 102 to its extended position, ramped surface 572 rides along outer end 552 of track 550 to gradually lower stationary room section 102 to its fully lowered position of FIG. 54a.

Again, a single track 550 or multiple tracks 550 can be used along the length of slide-out room section 102, with a wedge member 570 mounted to the underside of slide-out room section 112 for each track 550. The lifting arrangements of FIGS. 53a–53d and 54a–54d can be used in combination with any of the end condition mounting assemblies illustrated in the drawings and described in the foregoing text. In any embodiment, the lifting arrangement functions to insure that the outer end of slide-out room section 102 is moved to its fully elevated position when the inner end of slide-out room section 102 is supported on stationary room section floor 164. In the end condition mounting assembly embodiments which include a spring, the lifting arrangement functions to assist the spring in raising the outer end of slide-out room section 102 to its fully elevated position.

It can thus be appreciated that the invention contemplates a number of mounting assemblies for accommodating vertical movement of a slide-out room section relative to an extension member such as inner rail member 126, when a slide-out room section is moved between extended and retracted positions to provide a flat floor condition when fully extended and to provide a relatively simple and efficient construction enabling the slide-out room section to be raised relative to the stationary room section to allow retraction of the slide-out room section.

Various alternatives and embodiments are contemplated as being within the scope of the following claims particularly pointing out and distinctly claiming the subject matter regarded as the invention.

I claim:

1. In a flat floor arrangement for a vehicle having a movable room section, the movable room section having a floor with an inner and outer end which is movable laterally and vertically relative to a stationary room section having a stationary floor, said arrangement having an operating mechanism for laterally moving the movable room section relative to the stationary room section between a retracted position and an extended position for increasing the interior volume of the vehicle, said operating mechanism permitting vertical movement between said floor of said movable room section and said floor of said stationary room section between a first vertical position in which said movable room is extended and said movable room section floor is substantially flush with said stationary room section floor, and a second vertical position in which the movable room section is retracted and the movable room section floor is above the stationary room section floor, the improvement wherein:

said vehicle has a fixed member laterally outward of and beneath the level of said stationary floor and said movable floor has at least one lifter projecting downwardly so as to engage said fixed member at an intermediate lateral position between said extended position and said retracted position and lift said movable floor outer end of said movable room section floor by camming on said fixed member as said movable room is moved toward said retracted position after engaging said fixed member.

2. The improvement of claim 1, wherein each said lifter includes a roller engageable with an upper surface of said fixed member, said roller riding along said upper surface as the movable room section is moved toward its retracted position.

3. The improvement of claim 1, wherein each said lifter includes a wedge structure engageable with an upper surface of said fixed member, said wedge structure riding along said upper surface as said movable room section is moved toward its retracted position.

4. The improvement of claim 1, wherein said operating mechanism includes at least one rail connected to said movable room section which is extendable and retractable relative to said stationary room section.

5. The improvement of claim 4, wherein an end connecting structure connects each said rail to an outer end of said movable room section.

6. The improvement of claim 5, wherein said outer end of said movable room section is movable vertically relative to said rail and said end connecting structure includes a spring that exerts a biasing force which biases said movable room section upwardly.

7. The improvement of claim 6, wherein said connecting structure includes a generally vertically oriented post axially slidably received in a hole having a generally vertical axis, said post being slidable in said hole to permit vertical relative movement of said movable room section relative to said rail while extending and retracting said movable room section.

8. The improvement of claim 7, wherein said post can pivot relative to said hole so as to skew the axes of said post and hole and permit pivoting of said movable room section relative to said rail.

9. The improvement of claim 8, wherein said connecting structure includes an adjustable stop for limiting downward movement of said outer end of said movable room structure relative to said rail.

10. The improvement of claim 8, wherein said biasing force is adjustable.

\* \* \* \* \*